US008439534B1

(12) United States Patent
Roe et al.

(10) Patent No.: US 8,439,534 B1
(45) Date of Patent: May 14, 2013

(54) MOBILE LIGHTING APPARATUS

(76) Inventors: George Michael Roe, Seattle, WA (US); Leonard Elliott Klebanoff, Dublin, CA (US); Gerald W. Rea, Underwood, IN (US); Robert A. Drake, Nashville, IN (US); Terry A. Johnson, Livermore, CA (US); Steven John Wingert, Boise, ID (US); Thomas A. Damberger, Fair Oaks, CA (US); Thomas J. Skradski, Oakland, CA (US); Christopher James Radley, El Dorado Hills, CA (US); James M. Oros, Carmichael, CA (US); Paul G. Schuttinger, Orangevale, CA (US); David J. Grupp, Sacramento, CA (US); Stephen Carl Prey, Elk Grove, CA (US)

( * ) Notice: Subject to any disclaimer, the term of this patent is extended or adjusted under 35 U.S.C. 154(b) by 506 days.

(21) Appl. No.: 12/775,085

(22) Filed: May 6, 2010

Related U.S. Application Data

(60) Provisional application No. 61/176,103, filed on May 6, 2009.

(51) Int. Cl.
*B60Q 1/00* (2006.01)
*B60Q 3/00* (2006.01)

(52) U.S. Cl.
USPC ........... 362/486; 362/285; 362/418; 362/431; 362/458

(58) Field of Classification Search .................. 362/253, 362/257, 285, 384–386, 418, 428, 431, 458, 362/486
See application file for complete search history.

(56) References Cited

U.S. PATENT DOCUMENTS

| | | | |
|---|---|---|---|
| 4,167,783 | A | 9/1979 | Mitchell |
| 4,220,981 | A | 9/1980 | Koether |
| 4,392,187 | A | 7/1983 | Bornhorst |
| 4,712,167 | A | 12/1987 | Gordin et al. |
| 5,207,747 | A | 5/1993 | Gordin et al. |
| 5,225,765 | A | 7/1993 | Callahan et al. |
| 6,737,809 | B2 | 5/2004 | Espiau et al. |
| 6,922,021 | B2 | 7/2005 | Espiau et al. |
| 7,348,732 | B2 | 3/2008 | Espiau et al. |
| 7,358,678 | B2 | 4/2008 | Espiau et al. |
| 7,362,054 | B2 | 4/2008 | Espiau et al. |
| 7,362,055 | B2 | 4/2008 | Espiau et al. |
| 7,362,056 | B2 | 4/2008 | Espiau et al. |
| 7,372,209 | B2 | 5/2008 | Espiau et al. |
| 7,391,158 | B2 | 6/2008 | Espiau et al. |
| 7,429,818 | B2 | 9/2008 | Chang et al. |
| 7,498,747 | B2 | 3/2009 | Espiau et al. |
| 7,518,315 | B2 | 4/2009 | Espiau et al. |
| 7,525,253 | B2 | 4/2009 | Espiau et al. |
| 7,629,570 | B2 | 12/2009 | Mondloch et al. |
| 7,638,951 | B2 | 12/2009 | DeVincentis et al. |
| 7,701,143 | B2 | 4/2010 | DeVincentis |

(Continued)

OTHER PUBLICATIONS

Multiquip Inc., Multiquip Light Towers brochure, MQLTOWR-634 Rev. G (07-09), Jul. 2009, 4 pages.

(Continued)

*Primary Examiner* — Jason Moon Han
(74) *Attorney, Agent, or Firm* — Faegre Baker Daniels LLP

(57) ABSTRACT

A mobile lighting apparatus includes a portable frame such as a moveable trailer or skid having a light tower thereon. The light tower is moveable from a stowed position to a deployed position. A hydrogen-powered fuel cell is located on the portable frame to provide electrical power to an array of the energy efficient lights located on the light tower.

20 Claims, 22 Drawing Sheets

U.S. PATENT DOCUMENTS

| | | | |
|---|---|---|---|
| 7,719,195 | B2 | 5/2010 | DeVincentis et al. |
| 7,722,227 | B2 | 5/2010 | Zhang et al. |
| 7,791,278 | B2 | 9/2010 | DeVincentis et al. |
| 7,791,280 | B2 | 9/2010 | DeVincentis et al. |
| 2005/0134188 | A1 | 6/2005 | Lindqvist |
| 2006/0250090 | A9 | 11/2006 | Guthrie et al. |
| 2007/0211990 | A1 | 9/2007 | Espiau et al. |
| 2007/0211991 | A1 | 9/2007 | Espiat et al. |
| 2007/0217732 | A1 | 9/2007 | Chang et al. |
| 2007/0236119 | A1 | 10/2007 | Espiau |
| 2007/0241688 | A1 | 10/2007 | DeVincentis et al. |
| 2008/0054813 | A1 | 3/2008 | Espiau et al. |
| 2008/0203922 | A1 | 8/2008 | Guthrie et al. |
| 2008/0211971 | A1 | 9/2008 | Pradhan |
| 2008/0258627 | A1 | 10/2008 | DeVincentis et al. |
| 2009/0026911 | A1 | 1/2009 | Hafidi et al. |
| 2009/0026975 | A1 | 1/2009 | Ralston et al. |
| 2009/0073700 | A1 | 3/2009 | Cruickshank |
| 2009/0146543 | A1 | 6/2009 | Chang et al. |
| 2009/0167201 | A1 | 7/2009 | Duelli et al. |
| 2009/0243488 | A1 | 10/2009 | Espiau et al. |
| 2009/0284166 | A1 | 11/2009 | DeVincentis et al. |
| 2010/0097808 | A1 | 4/2010 | Jurik |
| 2010/0102724 | A1 | 4/2010 | Gilliard et al. |
| 2010/0123396 | A1 | 5/2010 | DeVincentis et al. |
| 2010/0123407 | A1 | 5/2010 | Duelli |
| 2010/0148669 | A1 | 6/2010 | DeVincentis et al. |
| 2010/0156301 | A1 | 6/2010 | Hollingsworth et al. |
| 2010/0156310 | A1 | 6/2010 | Hollingsworth et al. |
| 2010/0165306 | A1 | 7/2010 | McGettigan et al. |
| 2010/0171436 | A1 | 7/2010 | DeVincentis et al. |
| 2010/0253231 | A1 | 10/2010 | DeVincentis et al. |

OTHER PUBLICATIONS

Multiquip Inc., "Parts and Operation Manual—Multiquip Modular Light Tower (MLT) used with the Following Generators/Welders: DA7000SS, KD-1800, KD-6 and SDW-225", Revision #3, Jun. 26, 2006, 80 pages.

MOBILE LIGHTING APPARATUS

CROSS REFERENCE TO RELATED APPLICATION

This application claims the benefit of U.S. Provisional Application Ser. No. 61/176,103, filed on May 6, 2009, which is expressly incorporated by reference.

NOTICE

This invention was made in part with government support under Contract No. DE-AC04-94AL85000 awarded by the U.S. Department of Energy to Sandia Corporation. The government has certain rights in the invention.

BACKGROUND AND SUMMARY

The present disclosure relates to a mobile lighting apparatus which is easily positionable to illuminate indoor or outdoor locations. More particularly, the present disclosure relates to a mobile lighting apparatus which greatly reduces noise and harmful emissions compared to conventional mobile lighting systems.

The mobile lighting apparatus of the present disclosure includes a portable frame such as a moveable trailer or skid having a light tower thereon. The light tower is moveable from a stowed position to a deployed position. A hydrogen powered fuel cell is located on the portable frame to provide electrical power to an array of the energy efficient lights located on the light tower.

Reduction of carbon dioxide and particulate matter emissions is extremely challenging for internal combustion engines. The mobile lighting apparatus of the present disclosure substantially reduces carbon dioxide emissions and particulate matter emissions compared to conventional mobile lighting systems. For example, one conventional mobile lighting system using a diesel power generator typically uses hundreds of gallons of diesel fuel each year. There are many applications for the mobile lighting apparatus of the present disclosure including providing illumination for road work, emergency roadway lighting, aircraft and airport maintenance, film industry lighting, disaster recovery, and indoor use.

With regard to the film and television industry, the mobile lighting apparatus of the present disclosure provides very quiet operation, combined with zero emissions, to allow power for the lights to be brought very close to the point-of-shoot location. This reduces the need for long power cable lines running from an offsite power generator to the lighting system. The high efficiency lights of the present disclosure improve lighting quality and control and are more durable than current HID lighting technology. The present mobile lighting apparatus supports "green" initiatives, such as those in the film and television industries, and particularly those of the Academy of Motion Pictures, Arts and Sciences.

In one illustrated embodiment of the present disclosure, a mobile lighting apparatus includes a portable frame and a fuel cell mounted on the portable frame. The fuel cell generates electrical power for the mobile lighting apparatus. The apparatus also includes at least one fuel storage tank mounted on the portable frame, a light tower having a proximal end portion pivotably coupled to the portable frame and a distal end portion, and a plurality of lights coupled to the distal end portion of the light tower. Each of the lights is coupled to the fuel cell to receive electrical power therefrom. The fuel storage tank is coupled to the fuel cell to provide fuel to the fuel cell. The light tower is movable between a stowed position and an upright, deployed position. In illustrated embodiments of the present disclosure, the portable frame is one of a trailer and a skid.

In one illustrated embodiment of the present disclosure, the fuel cell is a hydrogen-powered fuel cell and the at least one fuel storage tank is a high pressure hydrogen storage tank. In another illustrated embodiment, the at least one fuel storage tank is a metal hydride storage tank configured to supply hydrogen to the hydrogen-powered fuel cell. The metal hydride storage tank illustratively includes a metal hydride powder located within a heat exchange structure.

In another illustrated embodiment of the present disclosure, the apparatus includes a fluid recirculation system located on the portable frame and a heat exchanger located adjacent the fuel cell. The fluid recirculation system is configured to circulate fluid through the heat exchange structure of at least one metal hydride fuel storage tank. The heat exchanger is also in fluid communication with the fluid recirculation system so that the heat exchanger transfers heat generated by the fuel cell to the fluid to warm the metal hydride powder as the heated fluid passes through the heat exchange structure of the metal hydride fuel storage tank.

In yet another illustrated embodiment of the present disclosure, a controller is coupled to the fluid recirculation system and to the fuel cell. The controller is configured to actuate a fan of the fuel cell at selected times when the fuel cell is not powering the lights. The fan is located adjacent the heat exchanger to cool fluid circulated by the fluid recirculation system through the heat exchange structure during refueling of the metal hydride fuel storage tank with hydrogen.

In a further illustrated embodiment of the present disclosure, at least one high pressure hydrogen storage tank is located on the portable frame along with at least one metal hydride storage tank. The high pressure storage tank is coupled to the fuel cell and to at least one metal hydride storage tank through a valve to permit hydrogen to be supplied from the at least one high pressure storage tank to at least one metal hydride storage tank to refuel the metal hydride storage tank.

In one illustrated embodiment of the present disclosure, the plurality of lights each include a plasma light emitter powered by a radio frequency (RF) driver coupled to the emitter. Illustratively, both the emitter and the driver are coupled to the distal end portion of the light tower. In another illustrated embodiment, the plurality of lights include an array of LEDs coupled to the distal end of the light tower.

Additional features and advantages of the present system will become apparent to those skilled in the art upon consideration of the following detailed description of illustrative embodiments exemplifying the best mode of carrying out the present system as presently perceived.

BRIEF DESCRIPTION OF THE DRAWINGS

The detailed description particularly refers to the accompanying figures in which.

DETAILED DESCRIPTION OF THE DRAWINGS

Figure 1:
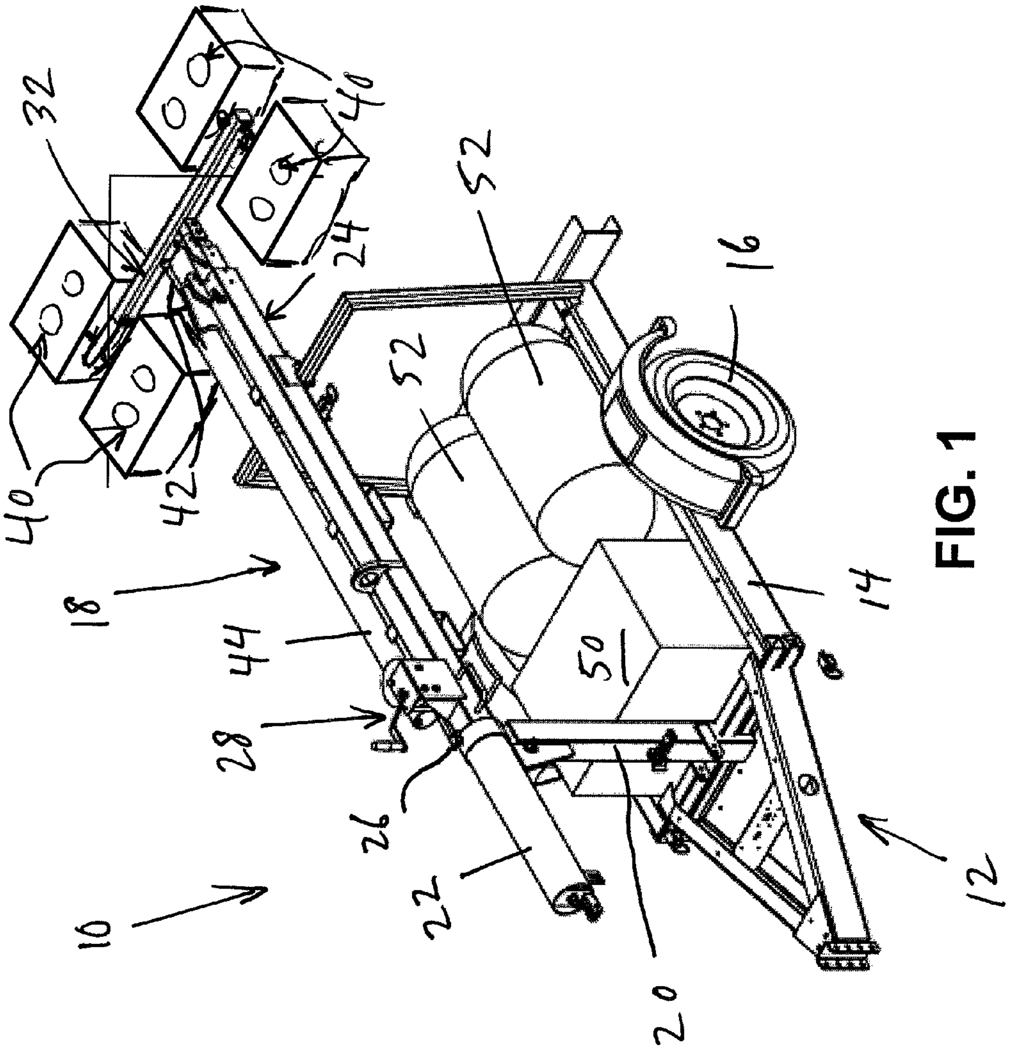
FIG. 1 is a perspective view of a mobile lighting apparatus of one embodiment of the present disclosure including a hydrogen fuel cell, hydrogen storage tanks and a light tower with an array of energy efficient lights mounted on a portable frame of a trailer.

For the purposes of promoting an understanding of the principles of the present disclosure, reference will now be made to the embodiments illustrated in the drawings, which are described below. The embodiments disclosed below are not intended to be exhaustive or limit the present system to the precise form disclosed in the following detailed description. Rather, the embodiments are chosen and described so that others skilled in the art may utilize their teachings. Therefore, no limitation of the scope of the claimed present system is thereby intended. The present system includes any alterations and further modifications of the illustrated devices, systems and described methods and further applications of the principles of the present disclosure which would normally occur to one skilled in the art. Corresponding reference characters indicate corresponding parts throughout the several views.

Figure 2:
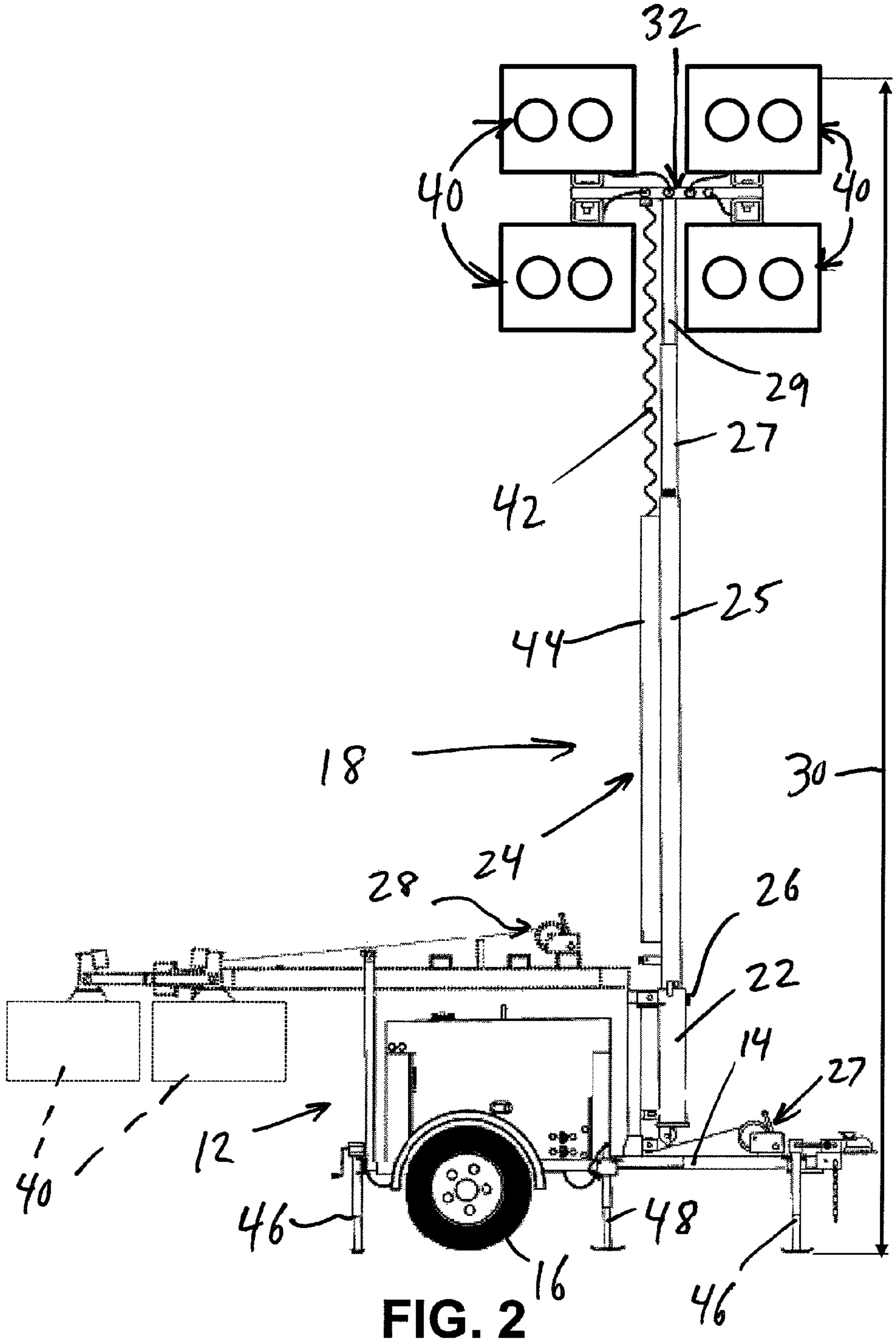
FIG. 2 is a side elevational view showing the light tower of FIG. 1 in a deployed position in solid lines and in a stowed position in dotted lines.

Referring now to the drawings, FIGS. 1 and 2 illustrate one embodiment of a mobile lighting apparatus 10 of the present disclosure. The mobile lighting apparatus 10 includes a trailer 12 having a frame 14 and wheels 16. In another embodiment, a skid movable by forklifts is used to support the frame 14. The trailer 12 is configured to be towed in a conventional manner. Mobile light apparatus 10 includes a light tower 18 pivotally coupled to the end upright member 20 of frame 14. Light tower 18 includes a base portion 22 and a telescoping mast 24. Mast 24 is rotatable about its longitudinal axis relative to base 22. A locking knob 26 is rotatable to secure the mast 24 in the desired rotational position relative to the base 22.

A first winch 27 on frame 14 as shown in FIG. 2 permits an operator to move the light tower 18 between a stowed position shown in FIG. 1 (and in dotted lines in FIG. 2) and an upright, deployed position shown in solid lines in FIG. 2. A second winch 28 located on the light tower 18 permits an operator to extend the mast 24 to a desired height shown by dimension 30 of FIG. 2. Illustratively, the mast 24 is extendable up to about 30 feet or more. Illustratively, trailer 12 includes jack stands 46 and a pair of outrigger jacks 48 to provide stability when the light tower is in the deployed position shown in FIG. 2.

In an illustrated embodiment, the mast 24 includes three separate telescoping sections 25, 27 and 29. A T-bar 32 is coupled to the innermost section 29 of mast 24 as shown in FIG. 2. An array of energy efficient lights 40 are coupled to the T-bar 32. Illustratively, the lights are plasma lights as discussed in detail below. In the illustrated embodiment, four lights 40 are coupled to the T-bar 32 as discussed in detail below. Each light 40 is independently adjustable relative to the T-bar 32. In alternative embodiments, the energy efficient lights are LEDs or other energy efficient lights. A retracting power cord 42 supplies electrical power to the lights 40. A storage cylinder 44 located adjacent mast 24 stores the power cord 42 when mast 24 is in a stowed position shown in FIG. 1 and in dotted lines in FIG. 2.

As best illustrated in FIG. 1, the mobile lighting apparatus 10 includes a hydrogen fuel cell 50 located on the portable frame 14. At least one hydrogen storage tank 52 is also located on the frame 14 for transport with the mobile lighting apparatus 10. In illustrated embodiments, either two or four such hydrogen storage tanks are preferably provided on the frame 14, depending upon the particular application and the availability of hydrogen refueling stations.

Figure 3:
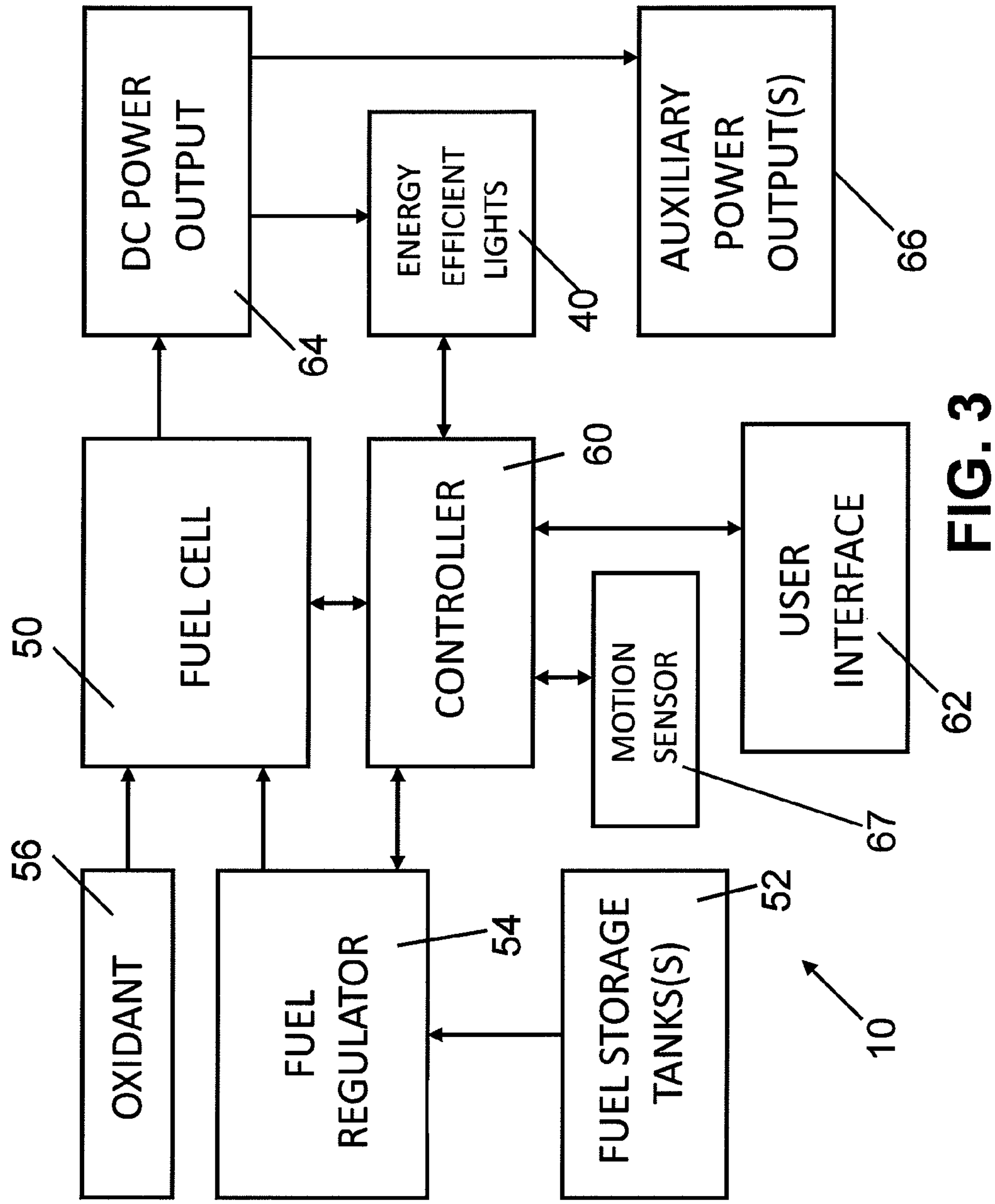
FIG. 3 is a block diagram of the components of the mobile lighting apparatus of one embodiment of the present disclosure.

Additional details of the mobile lighting apparatus 10 are illustrated in FIG. 3. A fuel regulator 54 is coupled between the fuel cell 50 and the fuel storage tanks 52 to deliver hydrogen to the fuel cell 50. An oxidant 56 is also supplied to the fuel cell 50. In an illustrated embodiment, the ambient air provides the oxidant 56 to the fuel cell 50 although other oxidant sources may be used if needed. In an illustrated embodiment, fuel cell 50 is a model FPS-5, 5 kW fuel cell available from Altergy Systems located in Folsom, Calif. The illustrative fuel cell is an example of a Proton Exchange Membrane Fuel Cell, but other types of fuel cells (solid oxide, phosphoric acid, molten carbonate, alkaline, etc.) may also be used.

Fuel cell 50 illustratively provides a high power density with low weight and volume. Fuel cell 50 uses pure hydrogen from fuel storage tanks 50. The oxidant 56 is obtained from ambient air. The fuel cell 50 provides very quiet operation of the mobile lighting apparatus 10.

A system computer, processor or controller 60 is coupled to fuel cell 50 and fuel regulator 54 to control operation of and monitor the fuel cell 50. Controller 60 is also coupled to the energy efficient lights 40 for monitoring and controlling operation of the lights 40. A user interface 62 is coupled to the controller 60. Illustratively, the user interface 62 is a graphical user interface which facilitates monitoring and control of the fuel cell 50 and energy efficient lights 40 as discussed below. The user interface 62 may be wirelessly coupled to the controller 60.

In the illustrated embodiment, fuel cell 50 provides DC power output 64 to supply power to the energy efficient lights 40 through power cable 42. Auxiliary power outputs 66 are also provided. The auxiliary power outputs 66 include DC power or AC power generated through an inverter. Auxiliary power outputs 66 provide power to other devices such as tools, other lighting, etc., as needed.

In another illustrated embodiment, a motion sensor 67 is coupled to controller 60. The motion sensor 67 is illustratively coupled to the light tower 18 to sense movement in an area near the mobile lighting apparatus 10. Preferably, motion sensor 67 is coupled to the mast 24 or the T-bar 32. Motion sensor 67 sends a signal to controller 60 to turn the lights 40 on in response to detecting movement in the area near the mobile light apparatus 10. Lights are shut off by controller 60 when no such movement is detected by motion sensor 67 for a predetermined time period. Controlling the lights 40 with motion sensor 67 reduces the amount of fuel required to power fuel cell 50 by reducing the power demand of the lights 40.

Figure 4:
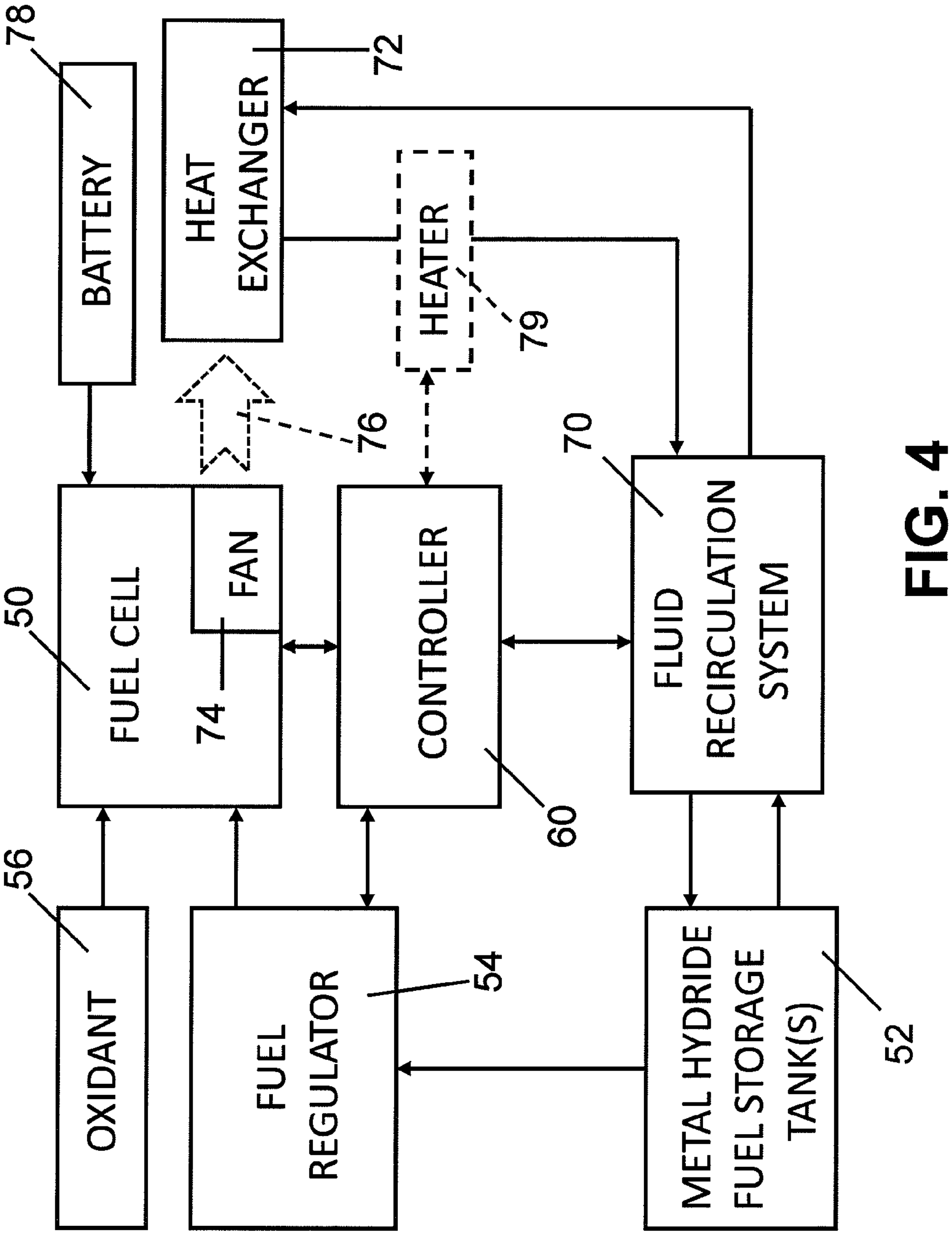
FIG. 4 is a block diagram illustrating components of another embodiment of the present disclosure including metal hydride fuel storage tanks for supplying hydrogen to the fuel cell.

In one illustrated embodiment, the fuel storage tanks 52 are 5000 psi tanks of hydrogen. In an alternative embodiment, the fuel storage tanks 52 are 10,000 psi tanks of hydrogen. Therefore, the high pressure hydrogen storage tank 52 typically stores hydrogen therein at a pressure of about 2,500 psi to about 10,000 psi. In a second alternative embodiment shown in FIG. 4, the storage tanks 52 are metal hydride storage tanks. In the FIG. 4 embodiment, a fluid recirculation system 70 including a fluid pump is coupled to each metal hydride fuel storage tank 52 and to a heat exchanger 72. Controller 60 is also coupled to the fluid recirculation system 70. The metal hydride fuel storage tank 52 includes illustratively a metal hydride powder contained within a heat exchange structure including heat exchange tubes located inside the tank 52. In an illustrative embodiment, the tank 52 includes an aluminum liner with a carbon fiber overwrap. Fluid recirculation system 70 circulates fluid through the internal heat exchange tubes of the storage tank 52.

Heat exchanger 72 is located adjacent fuel cell 50. Fuel cell 50 includes a fan 74 configured to discharge waste heat from the fuel cell 50. During operation of the fuel cell 50, heat is discharged as illustrated by arrow 76. Heat exchanger 72 transfers the heat 76 to fluid passing through the fluid recirculation system 70. The warm fluid passes through the metal hydride fuel storage tank 52 to warm the metal hydride powder and produce hydrogen to fuel the fuel cell 50. Typically, enough hydrogen remains within the tank 52 to start operation of the fuel cell 50 after the apparatus 10 has been shut down. A battery 78 on frame 14 may also be used for initial startup of the fuel cell 50.

Once the fuel cell 50 begins operation and discharging heat, the heat exchanger 72 and fluid recirculation systems 70 circulate the heat through the tank 52 so that the system is self-sustaining to generate hydrogen from the metal hydride material in tank 52. If necessary, an auxiliary heater 79 may be coupled to the fuel recirculation system 70 and controller 60 to provide auxiliary heating of the fluid. Heater 79 may be coupled to the battery 78 for initial heating and then receive power from the fuel cell 50 during operation of the mobile lighting apparatus 10. In an illustrated embodiment, heat exchanger 72 may be a model 4310 stainless steel tube form heat exchanger available from Lytron. The fuel cell 50 illustratively provides about 800 cfm of air flow at about 55 degrees C.

Fluid recirculation system 70 may also be used during refilling of the metal hydride storage tanks 52 with hydrogen. During the refilling process, heat is generated within the fuel storage tank 52 and must be dissipated. Therefore, fluid recirculation system 70 circulates fluid through the heat exchanger 72 adjacent fan 74 which cools the fluid during refilling. During refueling, the fuel cell 50 is typically not powering the lighting, so no fuel cell waste heat is being generated. Under these conditions, the fan 74 is blowing ambient temperature air, providing cooling to the fluid via heat exchanger 72. Alternatively, the tanks 52 may be connected to a fresh water supply or hose during refilling of the tank 52 to cool the tank 52.

Metal hydride storage tanks 52 allow storage of hydrogen without high pressure. Typically, the pressure within a metal hydride fuel storage tank 52 is about 200 psi as opposed to 5000 psi for high pressure hydrogen storage tanks. The metal hydride storage tanks 52 also reduce the volume of space required to store the hydrogen. High pressure gas takes up more space on the trailer 12. The metal hydride storage tanks 52 also allow hydrogen to be stored at room temperature, avoiding the need to generate and maintain the very cold temperatures required to store hydrogen as a liquid at 20K.

Refilling of the metal hydride storage tanks 52 takes a substantial amount of time, such as 4-8 hours, if a fresh, cool water supply for cooling the tanks 52 is not available. If such a cooling water supply is available, the tanks can be refilled in substantially less time, on order of 10-20 minutes.

Figure 5:
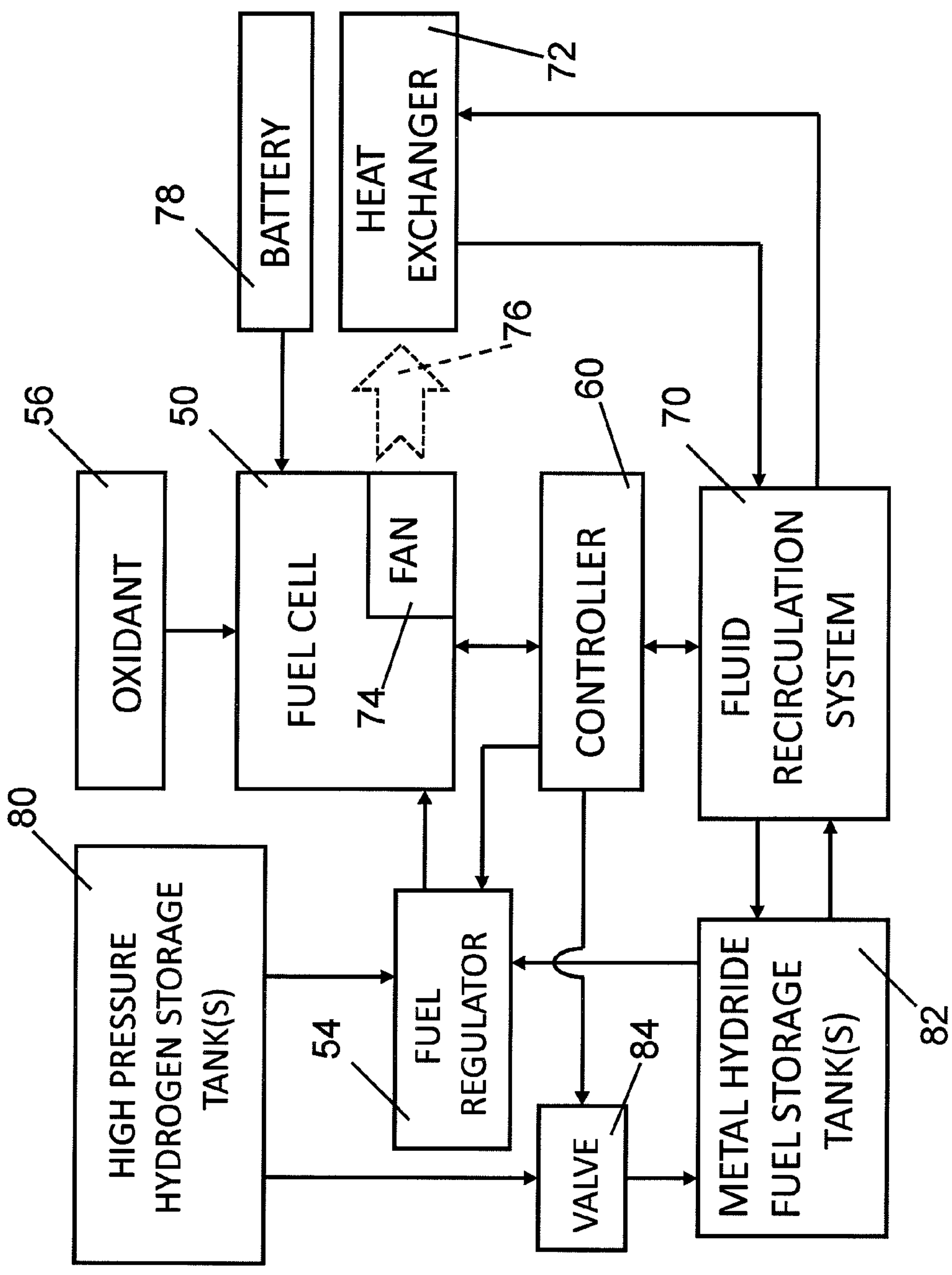
FIG. 5 is a block diagram illustrating yet another embodiment of the present disclosure in which both high pressure hydrogen storage tanks and metal hydride fuel storage tanks are provided to supply hydrogen to the fuel cell.

In another embodiment of the present invention, a combination of high pressure hydrogen storage tanks 80 and metal hydride fuel storage tanks 82 are provided in FIG. 5. At least one high pressure hydrogen storage tank 80 and at least one metal hydride fuel storage tank 82 are located on the frame 14 of trailer 12 to supply fuel to the fuel cell 50. Both the high pressure hydrogen storage tank 80 and metal hydride fuel storage tank 82 are coupled through the fuel regulator 54 of the fuel cell 50. Controller 60 is coupled to the fuel regulator 54 which includes control valves to select which of storage tanks 80, 82 supplies the fuel to the fuel cell 50.

A valve 84 is also coupled between the high pressure storage tank 80 and the metal hydride fuel storage tank 82. Valve 84 is also coupled to the controller 60. Hydrogen from the high pressure tank 82 is used to slowly refill the metal hydride fuel storage tank 82 with hydrogen while the lighting apparatus 10 is being used. During refill, the high pressure storage tanks 80 may be refilled first. During system use and also during times when the lights 40 are not in use, controller 60 and valve 84 permit hydrogen to bleed slowly from the high pressure tanks 80 to metal hydride tanks 82. If external cooling is not available for refill, controller 60 and valve 84 accommodate the 4-8 hour refill time during periods when the system is being used, or is normally idle. Current metal hydride tanks 82 are not typically high pressure rated tanks. For example, metal hydride tanks may only be rated to 3600 psi. Many hydrogen refilling stations require tanks which are rated at 5000 psi or above. Therefore, not all refilling stations are capable of refilling current metal hydride storage tanks 82. However under the system of FIG. 5, the high pressure tanks 80 may be filled and then used to fill the metal hydride fuel storage tanks 82 at a lower pressure through valve 84.

Figure 6:
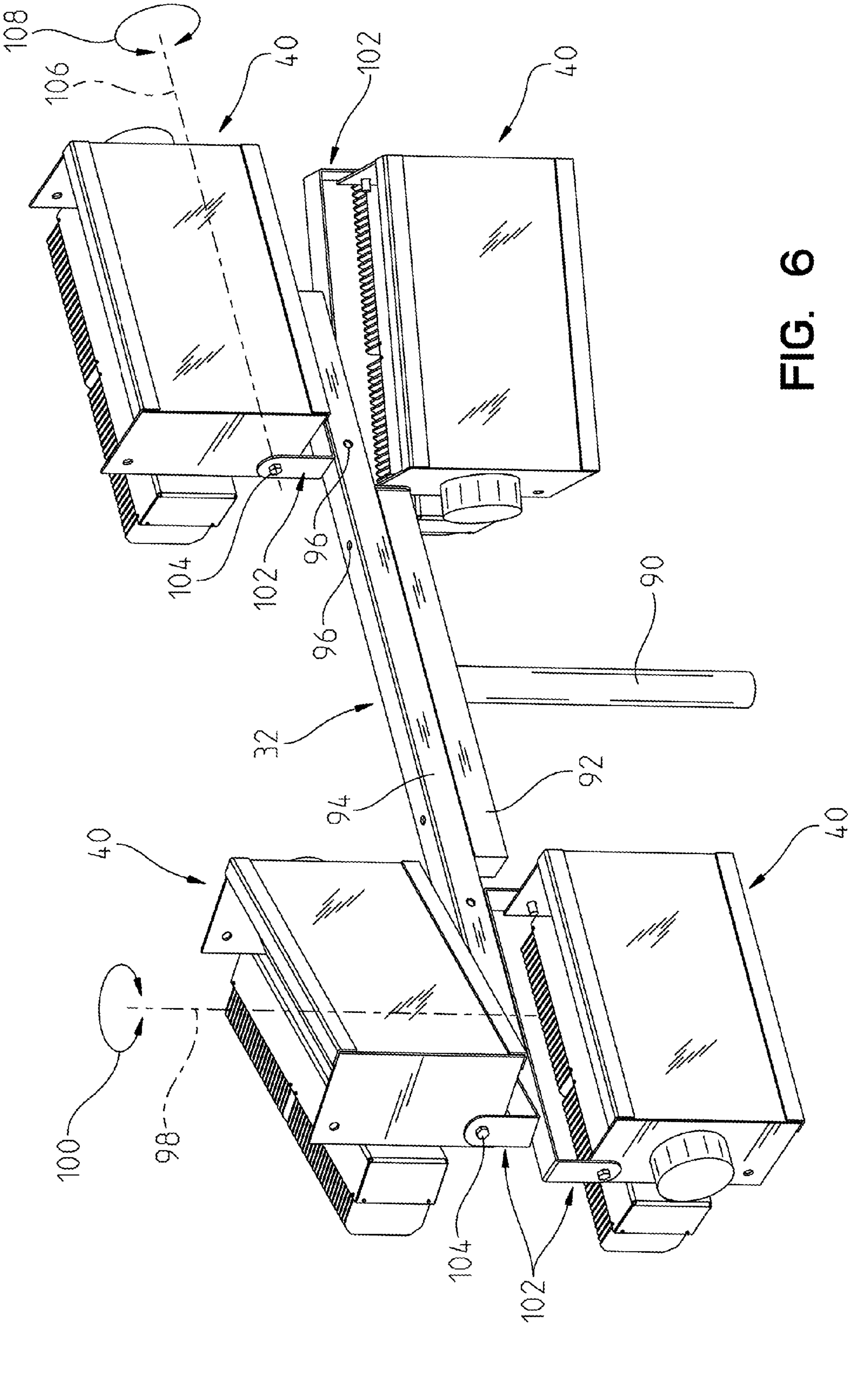
FIG. 6 is a perspective view illustrating an exemplary embodiment of an array of lights mounted on a T-bar of the light tower.
Figure 7:
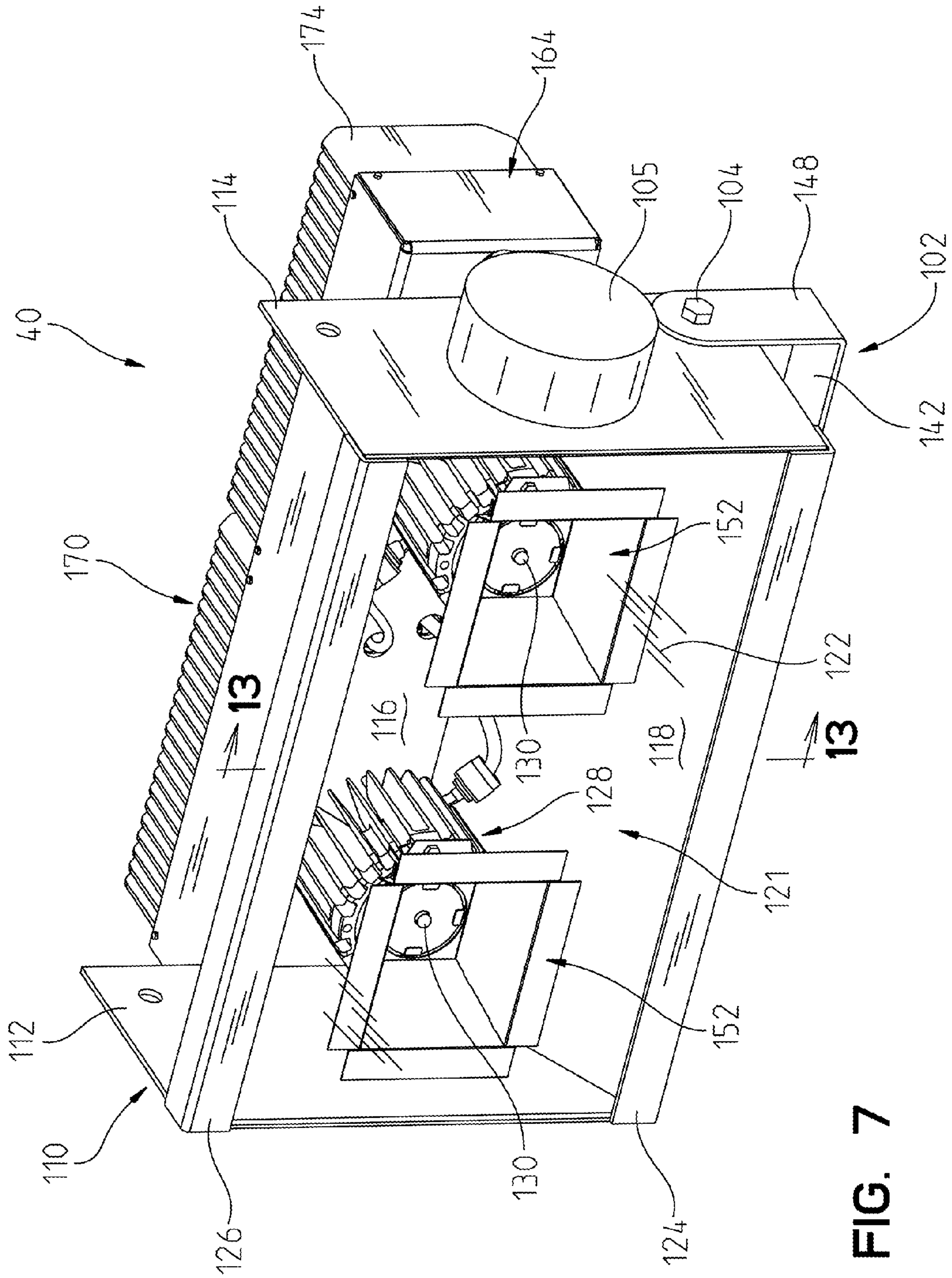
FIG. 7 is a perspective view of one of the energy efficient lights of FIG. 6.
Figure 8:
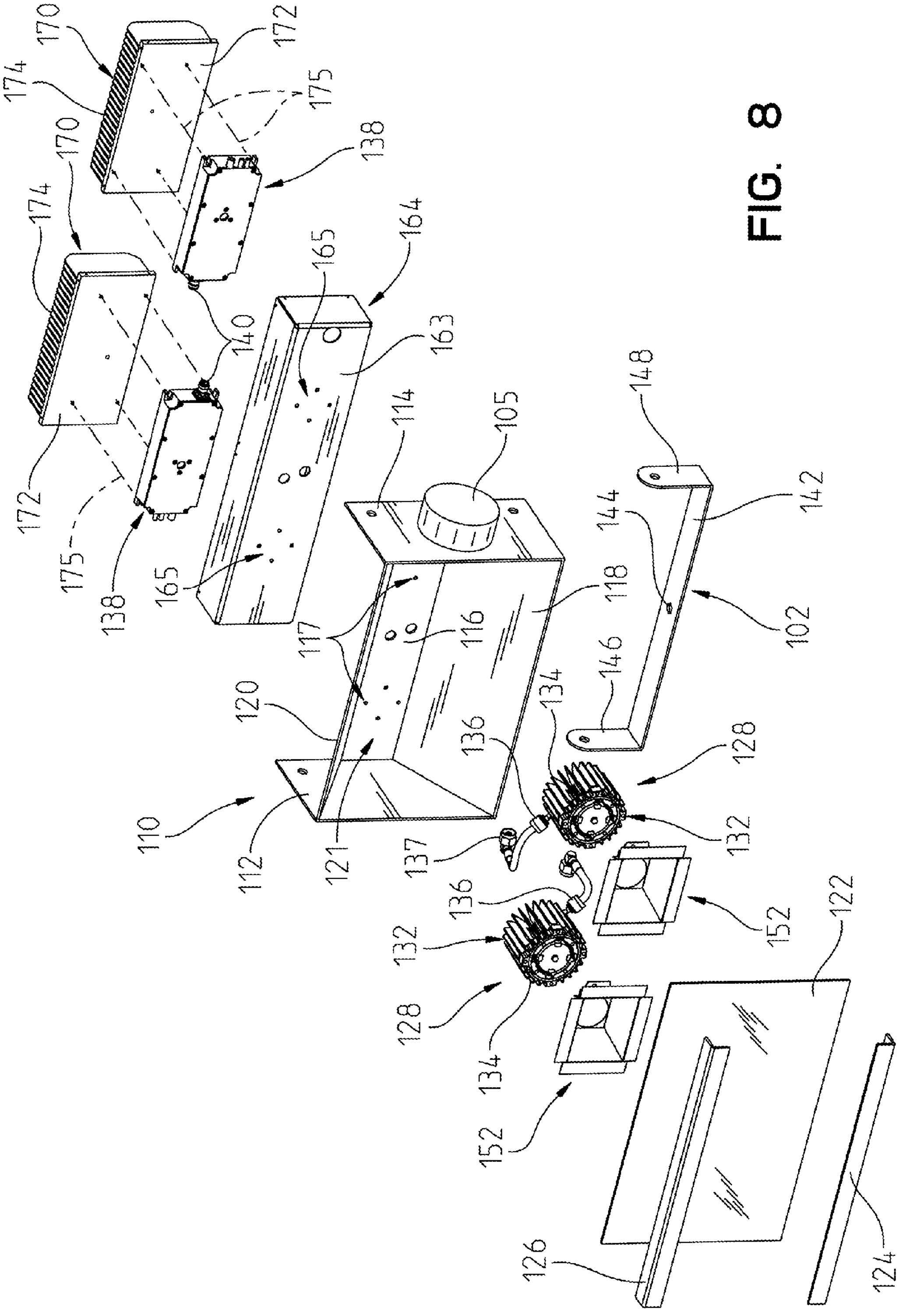
FIG. 8 is an exploded perspective view of the light of FIG. 7.

Details of an illustrative embodiment of the energy efficient lights 40 are illustrated in FIGS. 6-16. In the illustrative embodiment, four of the lights 40 are mounted to the T-bar 32 as discussed above, although more or less lights 40 may be used, if desired. As shown in FIG. 6, T-bar 32 includes a cylindrical portion 90 which extends into innermost section 29 of mast 24 to secure the T-bar 32 to the mast 24. T-bar 32 further includes a transverse support member 92 coupled to the cylindrical portion 90. A mounting bar 94 is coupled to support portion 92. Mounting bar 94 includes a plurality of spaced apertures 96 to permit mounting of the lights 40 at different locations thereon. In an illustrative embodiment, the lights 40 may be rotated about a mounting axis 98 as illustrated by double-headed arrow 100 in FIG. 6. Each of the lights 40 is independently adjustable. In one illustrated embodiment, the lights 40 are manually adjustable. In another embodiment, lights 40 are automatically adjustable through the use of suitable controls and motors. In an illustrated embodiment, the lights 40 are pivotable about axis 100 by 180° in either direction.

As shown in FIG. 6, the lights 40 are coupled to the mounting member 94 by a generally U-shaped mounting bracket 102. Lights 40 are coupled to the mounting brackets 102 by fasteners 104 so that the lights 40 are pivotable about an axis 106 as shown by double-headed arrow 108. Therefore, the lights are adjustable to pivot upwardly or downwardly about axis 106 as needed. In normal operation, the lights 40 are typically aimed slightly downwardly. A cylindrical knob or handle 105 may be gripped by an operator to facilitate adjustment of the position of the light 40.

Additional details of the lights 40 are illustrated in FIGS. 7-16. Each light 40 includes a housing 110 having first and second side panels 112 and 114, a rear wall 116, a bottom wall 118 and a top wall 120 defining an interior region 121 of the housing 110. A window 122 is coupled to the housing 110 by connector strips 124 and 126. Window 122 is made of glass or other suitable material which allows light to pass therethrough.

In an illustrated embodiment, a pair of light emitters 128 are located within the housing 110 as best shown in FIGS. 7, 8 and 13-15, for example. In other embodiments, a single emitter 128 is used. Each of the emitters 128 is illustratively a model number STA 40-02 light emitting plasma emitter available from Luxim® located in Sunnyvale, Calif. The emitters 128 illustratively include a bulb 130 located within a dielectric material in a puck. The puck is mounted within a body portion 132 having a plurality of heat sinking fins 134 formed thereon. A coaxial cable connector 136 is coupled to the body 132. Each coaxial connector 136 is coupled to a radio frequency (RF) driver 138 by a coaxial cable 37 also coupled to a coaxial connector 140 on the driver 138. The drivers 138 generate a radio frequency (RF) signal which is guided through the coaxial cables 137 and the puck into an energy field around the bulb 130. The high concentration of energy in the electric field vaporizes contents of the bulb 130 into a plasma state at the center of bulb 130 to generate an intense source of light.

As discussed above, a U-shaped mounting bracket 102 includes a central mounting portion 142 having an aperture 144 configured to receive a fastener to secure the mounting bracket 102 to the mounting bar 94 as discussed above with reference to FIG. 6 above. The mounting bracket 102 further includes first and second end portions 146 and 148 which are coupled to the first and second side panels 112 and 114, respectively, of housing 110 by suitable fasteners 104.

A pair of reflectors 152 are also located within housing 110. A reflector 152 is coupled to each emitter 128 as best illustrated in FIG. 14. The body portion 132 of each emitter 128 includes threaded apertures 154 configured to receive fasteners 156. The fasteners 156 extend through apertures 158 formed in a flange 160 of reflector 152. An outer flange 162 of reflector 152 is located at or near the window 122 as shown in FIG. 13.

A driver mounting portion 164 has a surface 163 mounted to the rear wall 116 of housing 110. Emitters 128 are mounted to housing 110 by fasteners 166 best shown in FIG. 15 which extend through apertures 165 formed in the surface 163 of driver mounting portion 164, through apertures 117 in rear wall 116 and into threaded openings 168 formed in body portions 132 of emitters 128. FIG. 13 illustrates that the fasteners 116 secure the emitters 128 within the housing 110 by drawing the body portion 132 into the V-shaped section formed by walls 118 and 120 in the direction of arrow 169.

Figure 13:
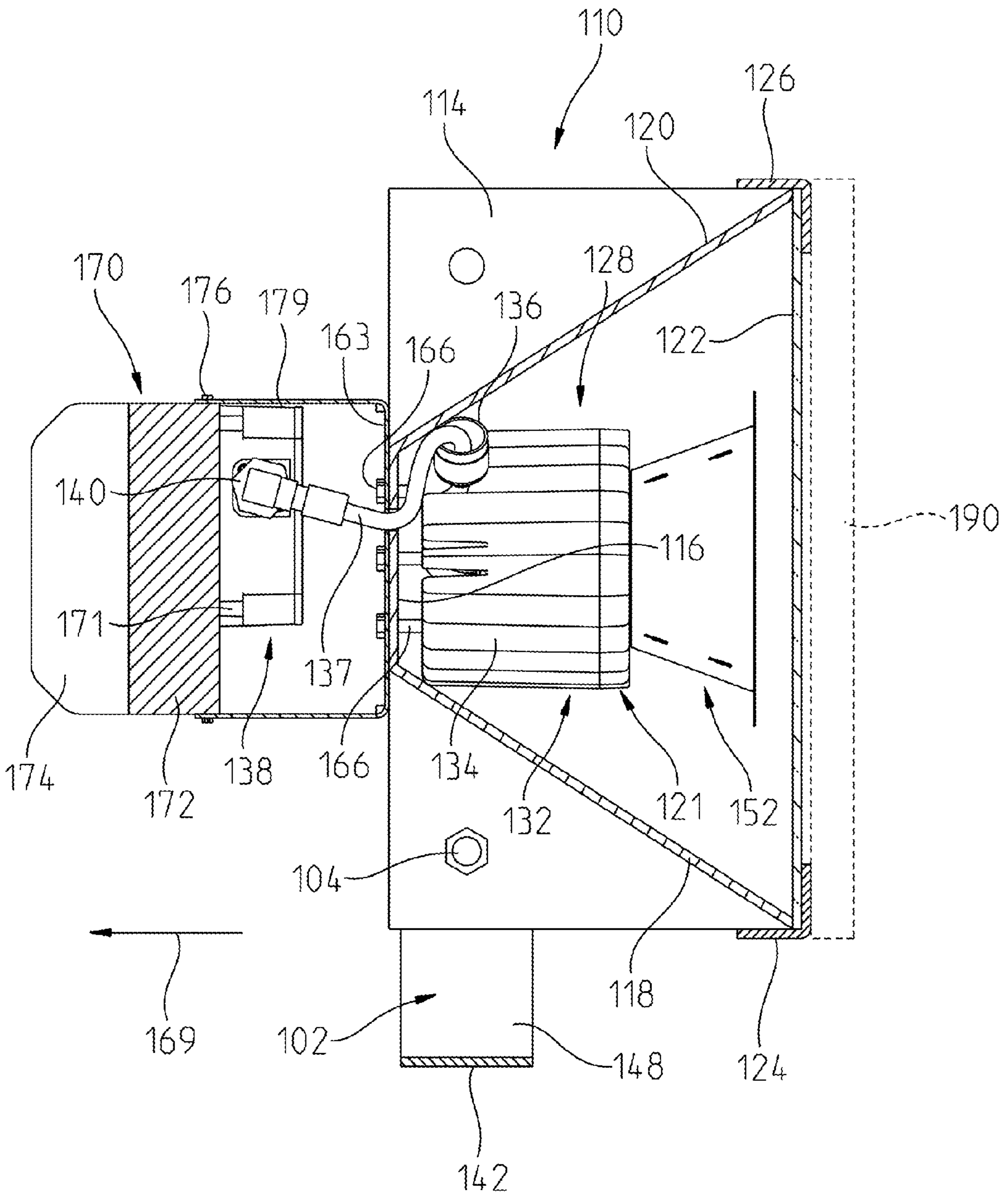
FIG. 13 is a sectional view taken along lines 13-13 of FIG. 7 illustrating additional details of the light.
Figure 14:
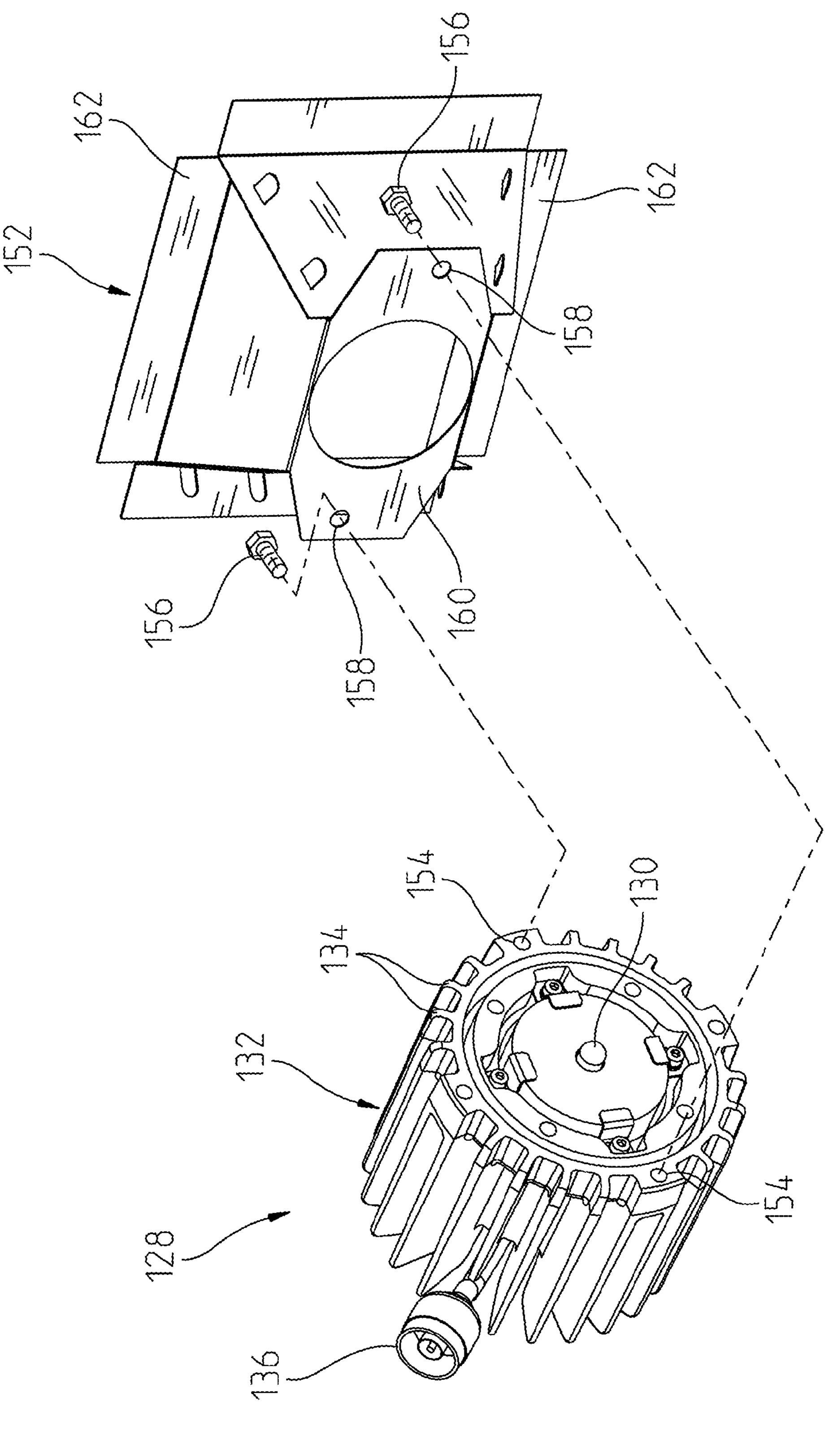
FIGS. 14-16 are exploded perspective views illustrating additional details of mounting components located within the light assembly of FIGS. 7-13.
Figure 15:
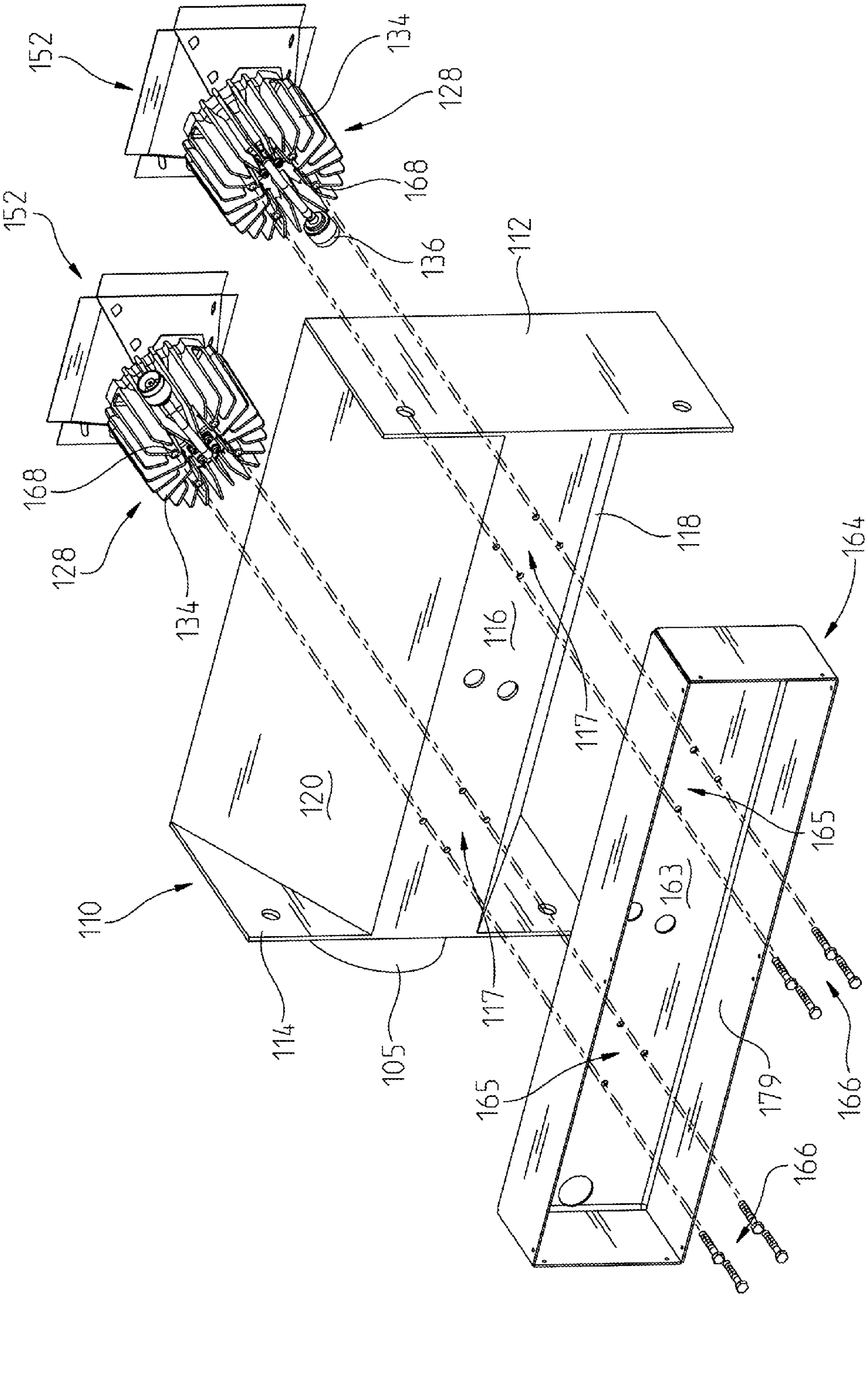
Figure 16:
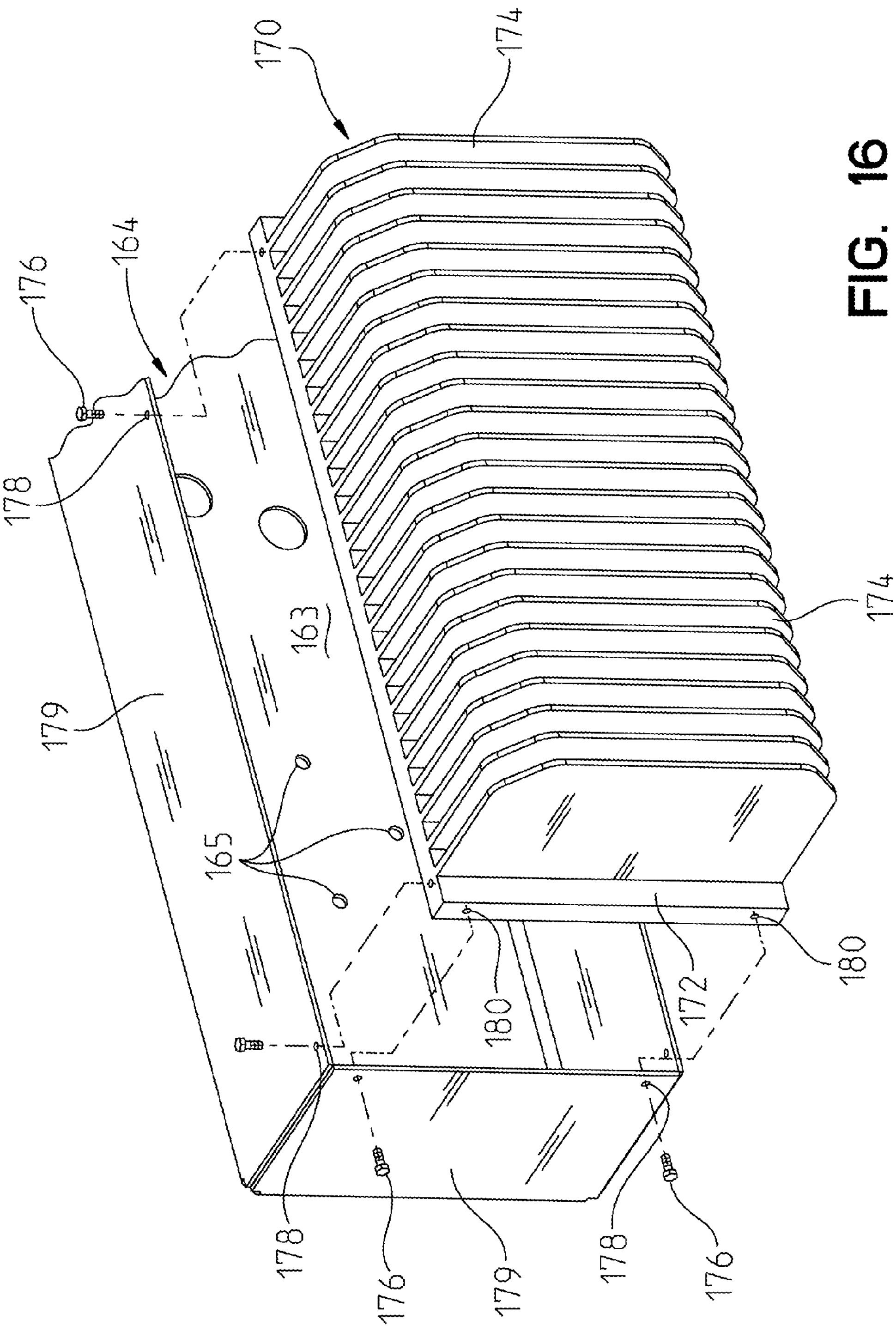

FIG. 13 also illustrates the coaxial cable 137 extending between the connector 136 on emitter 128 and the connector 140 on driver 138. Drivers 138 are mounted to heat sink blocks 170, illustratively by four fasteners extending through apertures 171 in the drivers 138 and into a body portion 172 of heat sink blocks 170 as shown by dotted lines 175 of FIG. 8, for example. The heat sink blocks 170 include a plurality of heat sinking fins 174 extending away from the body portion 172 to dissipate heat generated by the drivers 138 during operation of the lights 40. Each heat sink block 170 is coupled to the driver mounting portion 164 by fasteners 176 which extend through apertures 178 formed in a side wall 179 of driver mounting portion 164 and into threaded apertures 180 formed in body portion 172 of the heat sink block 170.

Figure 9:
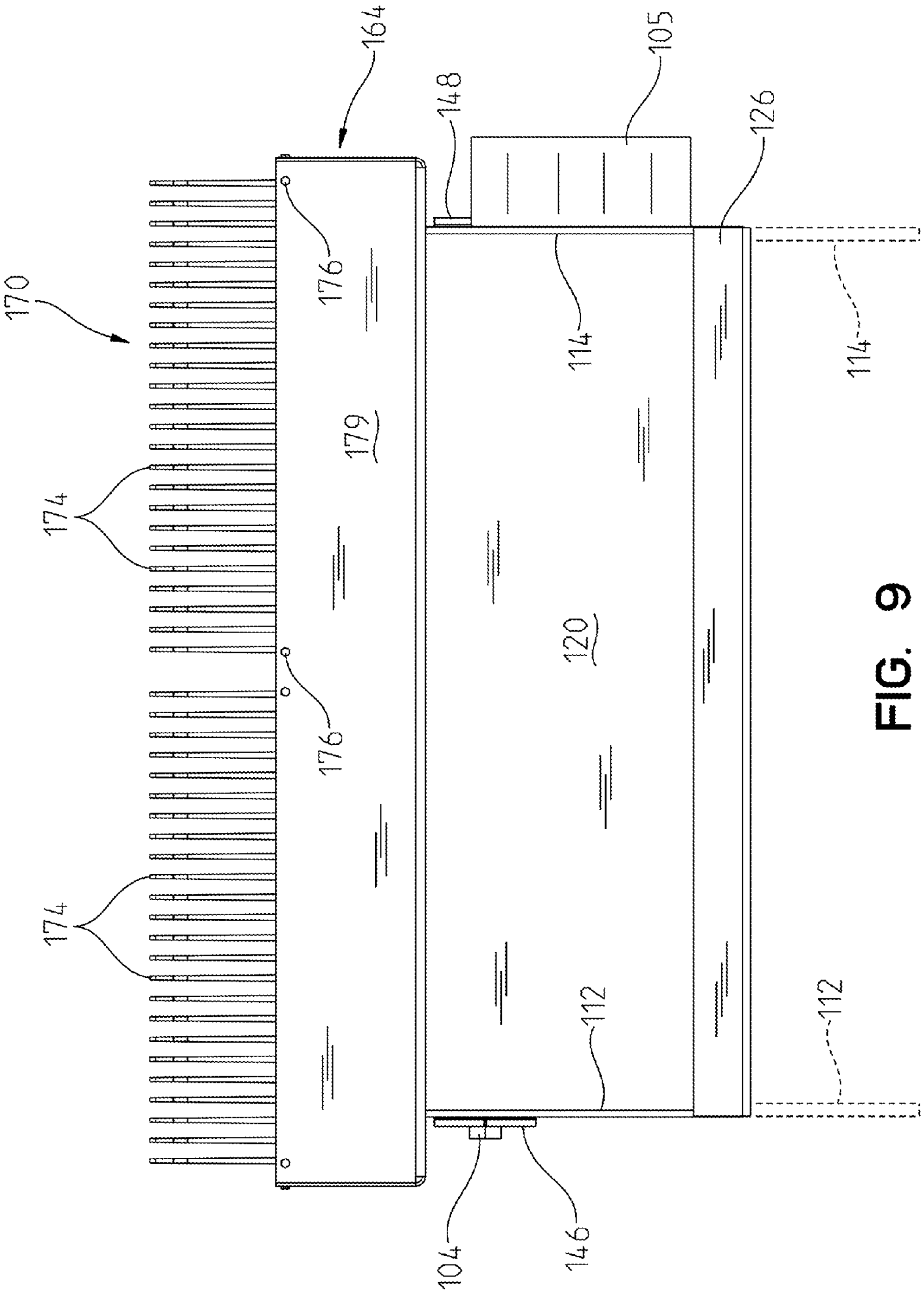
FIG. 9 is a top view of the light of FIGS. 7 and 8.
Figure 10:
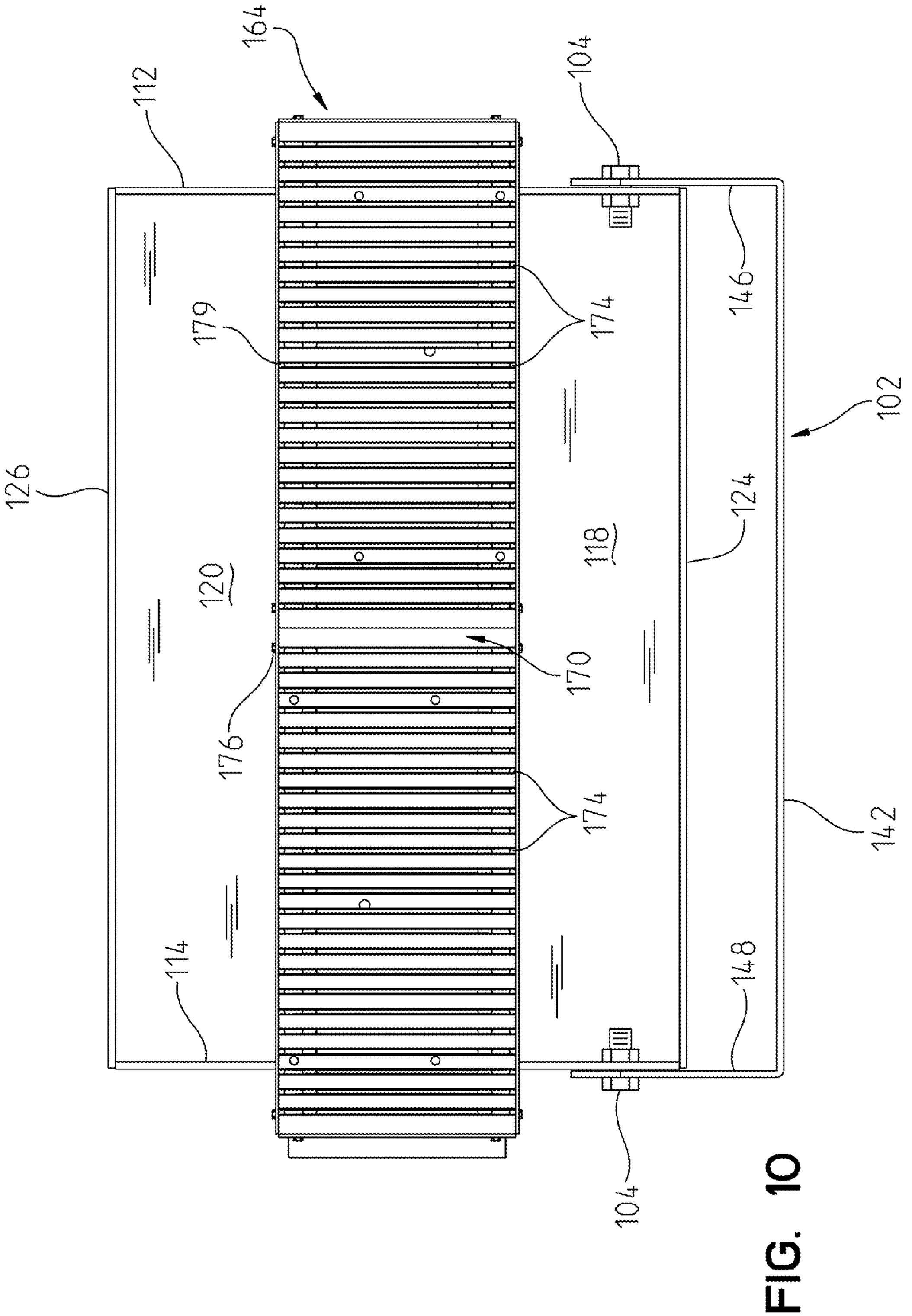
FIG. 10 is a rear view of the light of FIGS. 7-9.
Figure 11:
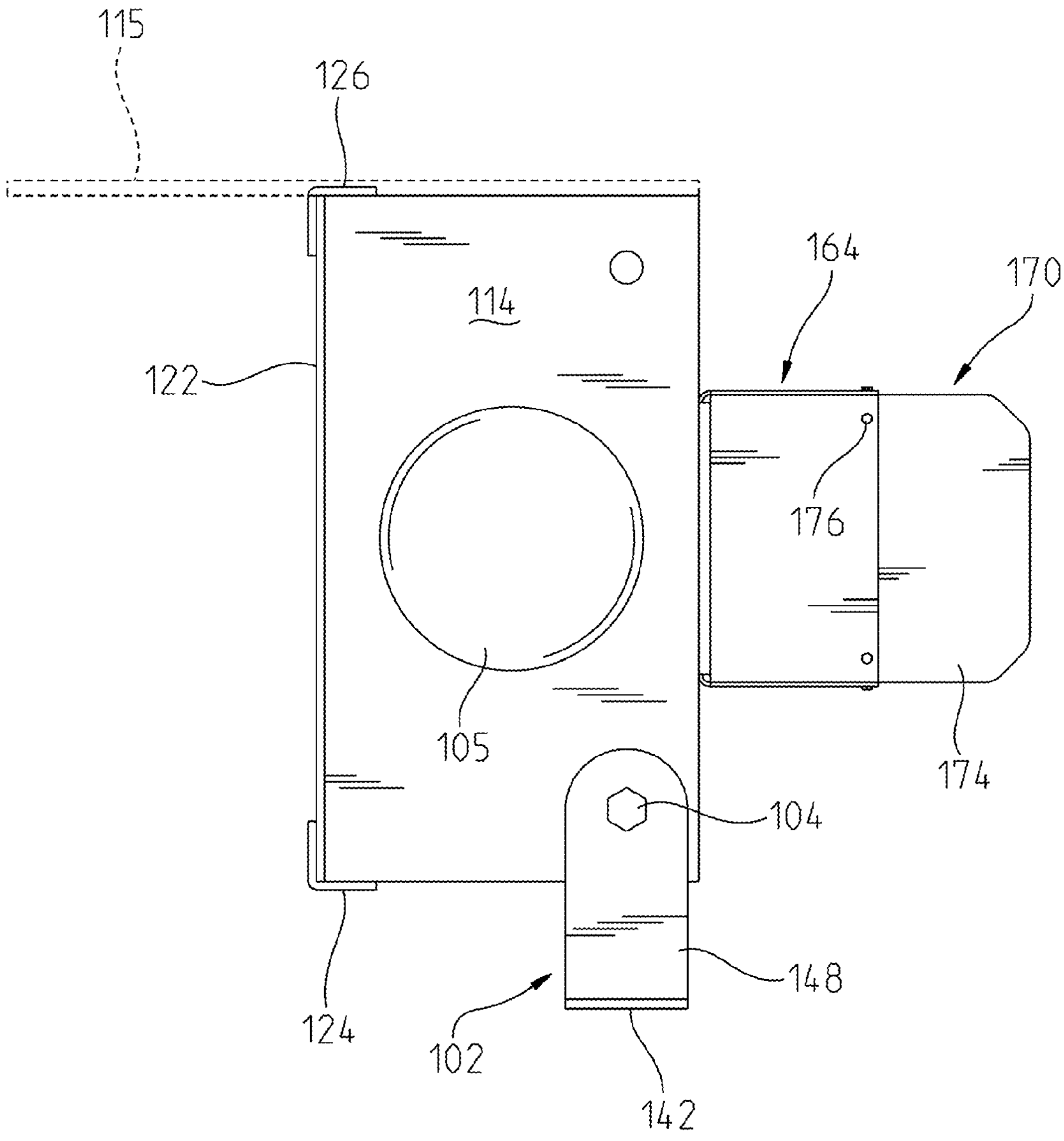
FIG. 11 is a side elevational view of the light of FIGS. 7-10.
Figure 12:
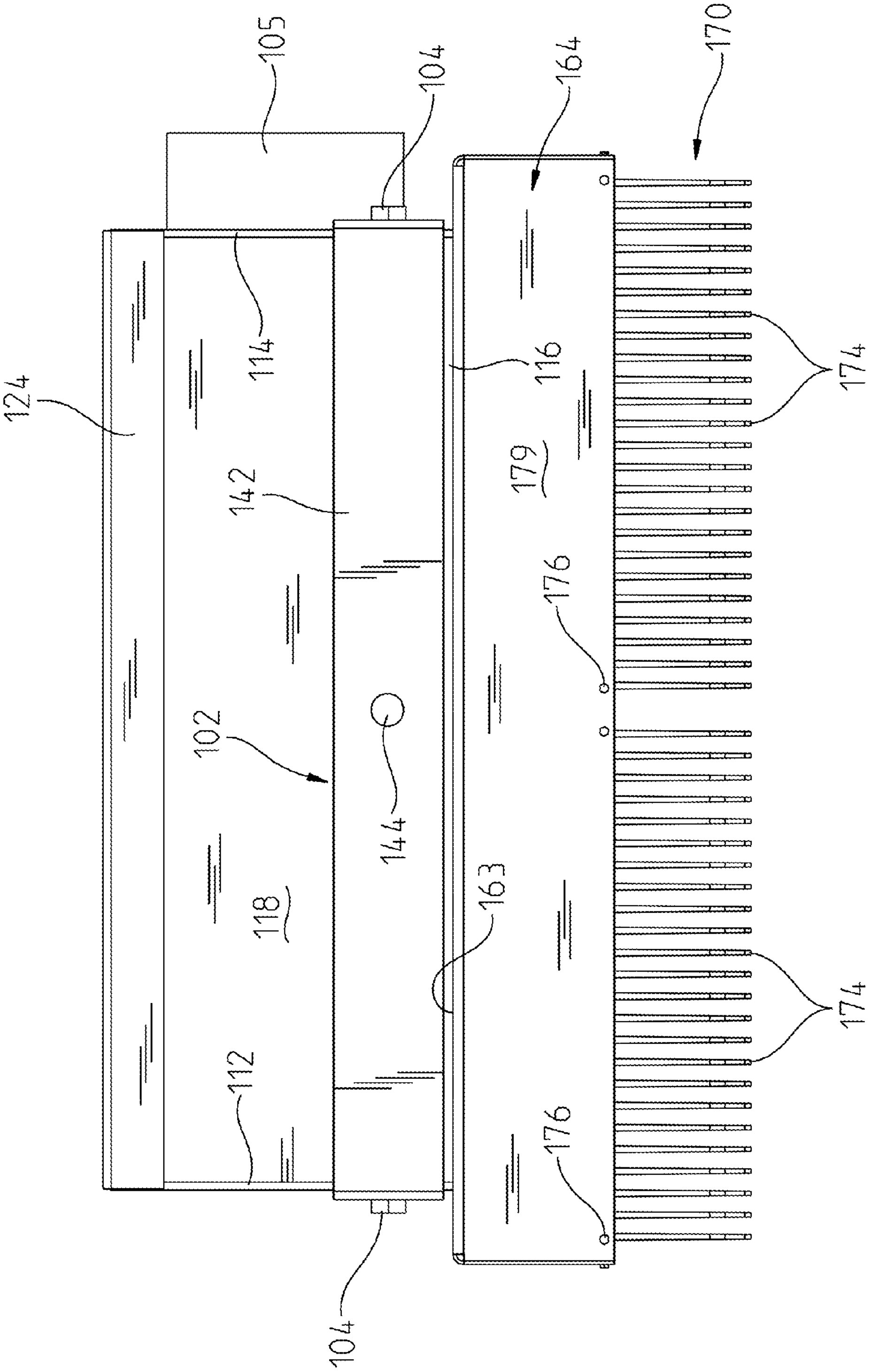
FIG. 12 is a bottom view of the light of FIGS. 7-11.

In certain applications, the side panels 112 and 114 of housing 110 may be extended such as shown, for example, in FIG. 9 for glare control. The extended side panels 112 and 114 act as light baffles to provide glare control for the portable lights 40 when needed, such as when the lights 40 are used for road work. A top baffle 115 may also be added, if necessary, as illustrated in FIG. 11. Top baffle 115 may be helpful to reduce glare when the lights 40 are used next to a building or overpass, for example.

Figure 17:
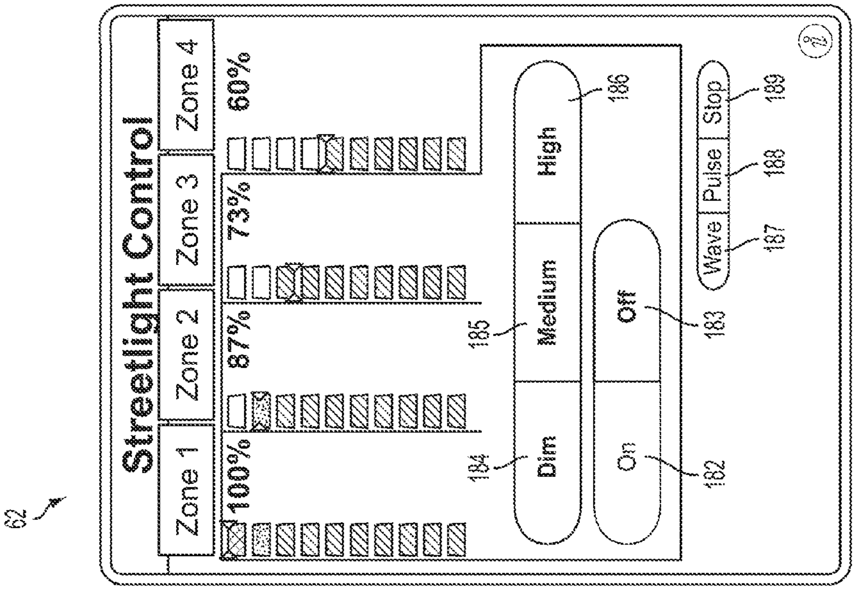

As discussed above, a graphical user interface 62 is provided to control and monitor the lights 40 and fuel cell 50. The user interface may be provided on a remote computing device such as a laptop computer, phone, PDA, or other suitable device. In an illustrated embodiment shown in FIGS. 17 and 18, an illustrative I-phone application is shown. In the illustrated embodiment, each zone controls one of the lights 40 shown in FIGS. 1, 2 and 6. The operator can turn each individual light 40 on and off by selecting input buttons 182 or 183, respectively. The operator can also control the intensity of each light zone using the "dim", "medium", and "high" buttons 184, 185 and 186, respectively. The graphical user interface 62 illustratively displays the percentage of intensity of each of the zones and provides a graphical display representing the intensity. The operator may also select the "wave", "pulse", and "stop" buttons 187, 188 and 189. Buttons 187, 188, and 189 allow the user to start and stop a program which controls the lights over a predetermined time interval. The wave button 187 controls the lights individually. The pulse button 188 synchronously controls all lights in the array.

Figure 18:
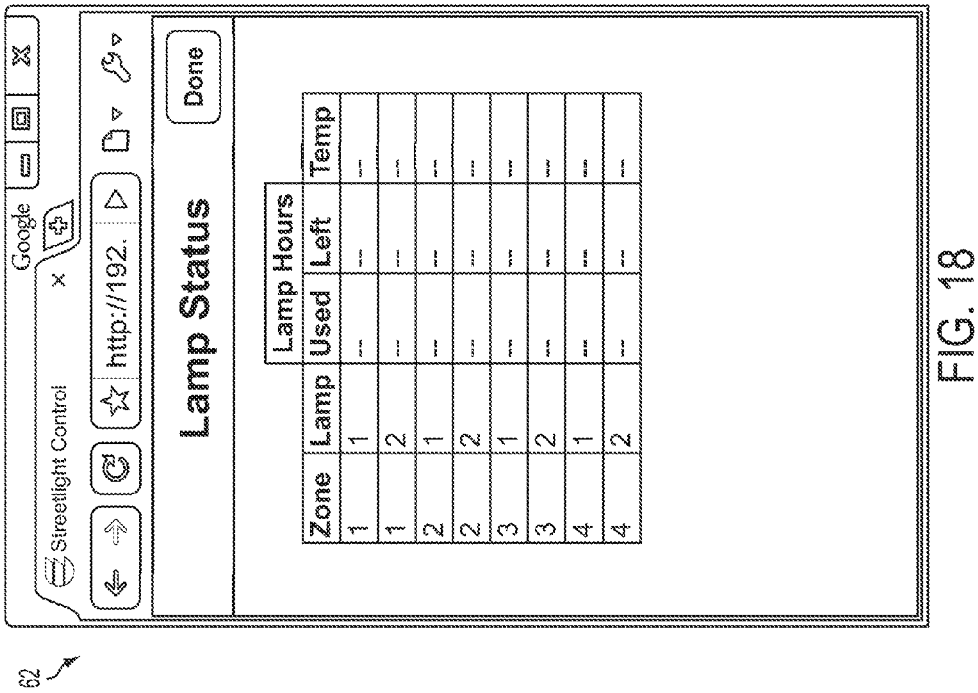
FIGS. 17 and 18 illustrate a graphical user interface used to control and monitor the lights.

FIG. 18 illustrates a lamp status display screen provided on the user interface 62, such as for example, the display screen of an I-phone in the I-phone application. In the illustrated embodiment, each zone includes one light 40 having two lamps or bulbs 130. For each zone, the status of each lamp is provided. For example, the number of lamp hours used and the number of lamp hours remaining are displayed for monitoring by the operator. In addition, a temperature of each lamp is also monitored and displayed.

In another embodiment of the present invention, particularly useful in the film or television industry, color may be added to the lights 40. For example, color slides may be mounted in a receiver 190 located in front of window 122 as shown diagrammatically in FIG. 13. In an alternative embodiment, colored gels are injected into a receiver 190 adjacent window 122 to provide color for the light. In this embodiment, a chiller is typically provided for the gel. The chiller and gel dispenser may be powered by the fuel cell 50 to provide a portable, self-contained, light coloring system. Dichroic filters may also be used when rigid color requirements are necessary. In an illustrated embodiment of the light tower which uses LEDs as the light source, the LEDs may be RGB color tunable diodes.

As discussed above, in the illustrated embodiment, the lights 40 are energy efficient lights such as the plasma lighting discussed above. Features of the plasma lighting include:

High efficiency—120 lumens/watt;
50,000 hour lifetime;
Color rendering up to 96 CRI;
30 Second turn-on, dimmable to 20%;
Rapid re-strike;
Compact source (¼"×¼");
No audible noise or flicker;
Programmable;
Indoor and outdoor use.

In other embodiments of the present invention, other types of energy efficient lights 40 may be used. For example, lights 40 may include an array of LEDs arranged on lighting panels. The lighting panels may be louvered panels to provide adjustability and improve aerodynamics when the light panels are used on the portable trailer 12. Louvers and baffling may also be used in order to decrease glare from the view of any person located outside the illuminated area. This may be particularly important for roadside construction lighting projects.

Figure 19:
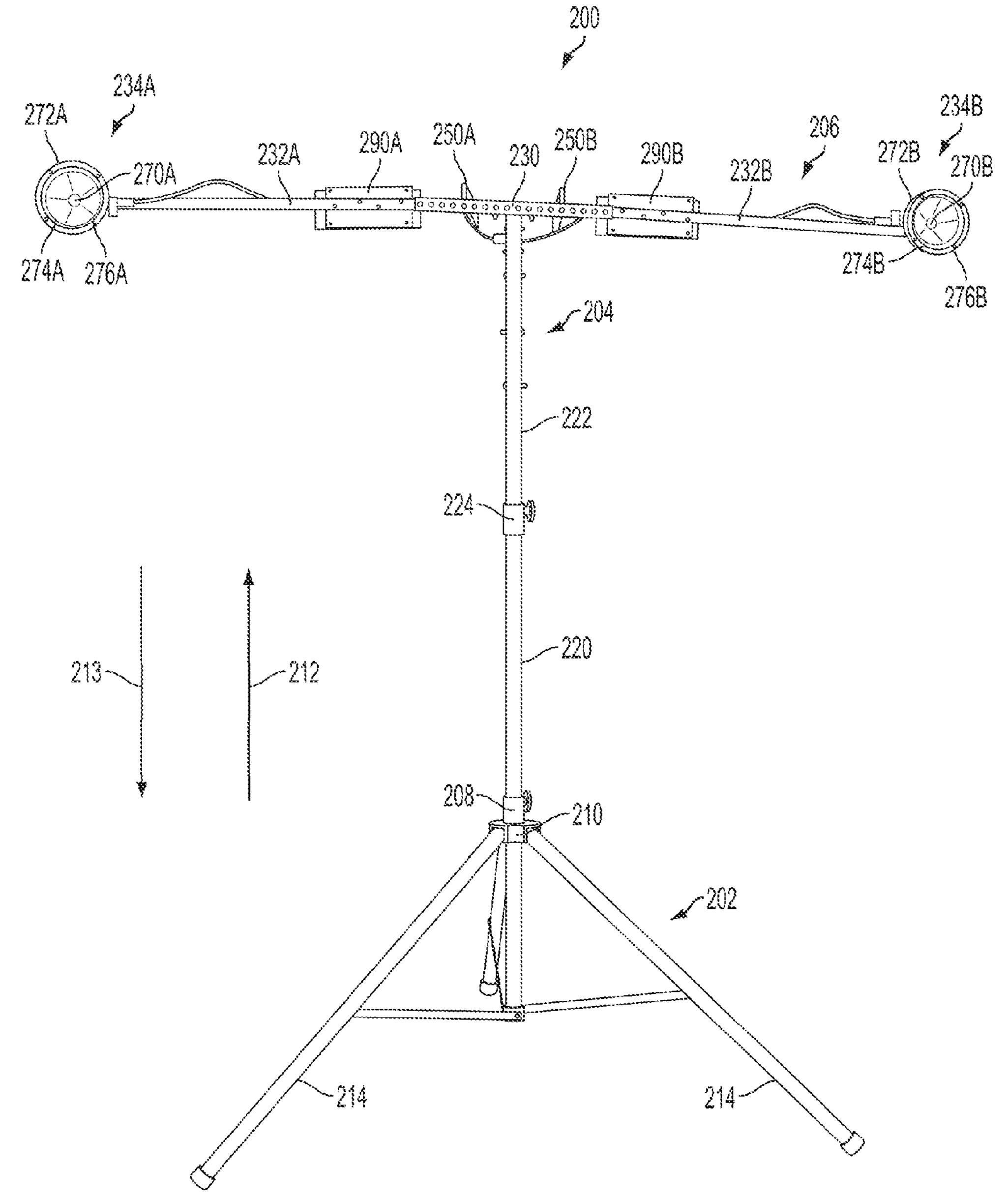
FIG. 19 is a front view of an exemplary portable light device.

Referring to FIG. 19, another embodiment of a portable light device 200 is shown. Portable light device 200 includes a base 202, an adjustable vertical member 204, and a light unit supporting member 206. Adjustable vertical member 204 is supported by base 202. Light unit supporting member 206 is supported by vertical member 204 and is angled relative thereto. Base member 202 is illustrated as a tripod base, but may be any suitable base that provides a stable support for vertical member 204 and light unit supporting member 206. In a preferred embodiment, base member 202 (such as the illustrated tripod base) is collapsible for ease of storage. In the illustrated embodiment, the tripod base is secured in the use position (shown in FIG. 19) by tightening a knurled knob 208 which engages vertical member 204. When knurled knob 208 is loosened, a top portion 210 of the tripod base is able to move in direction 212 which results in legs 214 being positioned generally parallel to and adjacent vertical member 204.

Vertical member 204 includes a lower member 220 and an upper member 222. In the illustrated embodiment both lower member 220 and upper member 222 are of a tubular construction and upper member 222 is received into lower member 220 to provide a telescopic adjustment of a height of portable light device 200 in directions 212 and 213. In one embodiment, the height of portable light device 200 is adjustable from about 5.5 feet to about 10 feet. A knurled knob 224 is coupled to lower member 222 and is threaded into a hole therein to engage an exterior of upper member 222. When knurled knob 224 is loosened upper member 222 is able to be moved relative to lower member 220 to adjust a height of portable light device 200. In one embodiment, a height of portable light device is lowered to place portable light device 200 in a storage configuration.

Figure 25:
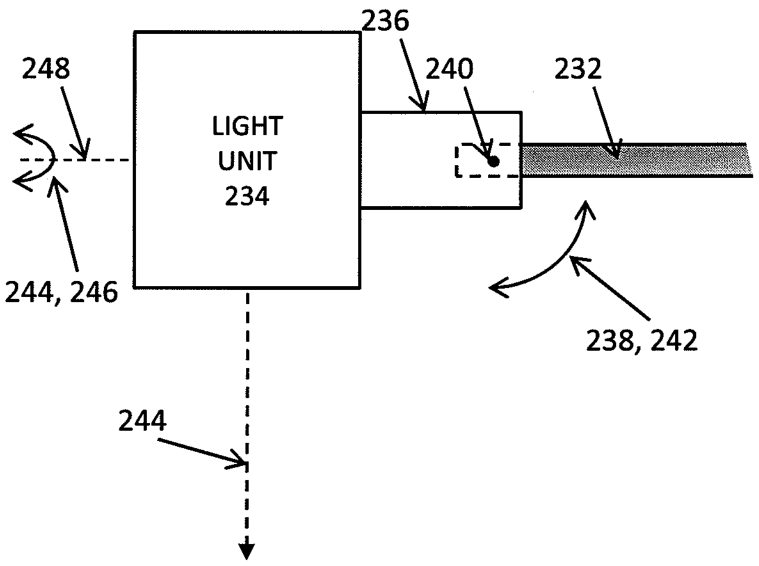
FIG. 25 is a representative view of portions of the exemplary portable light device of FIG. 19.

Light unit supporting member 206 includes a central member 230 which is coupled to upper member 224 of vertical member 204. Light unit supporting member 206 further includes a first light supporting arm 232A and a second light supporting arm 232B which support a first light unit 234A and a second light unit 234B, respectively. Referring to FIG. 25, each of light units 234A, B is pivotally mounted to its respective arm 232A, B and pivots about an axis 240. As shown in FIG. 25, the light unit is supported by a base 236 which is pivotally mounted to the arm 232A, B. In one embodiment, a set screw is provided to unlock the orientation of light unit 234A, B in directions 238, 242 relative to arm 232A, B. This adjustability allows light unit 234A, B to be directed inward towards vertical member 204 or outwards away from vertical member 204. In one embodiment, light unit 234A, B is positioned such that the light is centered generally in a direction 244 which is normal to arm 232A, B.

Base 236 also provides adjustability of light unit 234A, B in directions 244, 246 which means light unit 234A, B may pivot about an axis 248 that is parallel to a longitudinal axis of arm 232A, B. In one embodiment, a set screw is provided to unlock the orientation of light unit 234 A, B in directions 244, 246 relative to arm 232A, B. This adjustability allows light unit 234A, B to be directed downward towards base 202 or upwards away from base 202.

Figure 20:
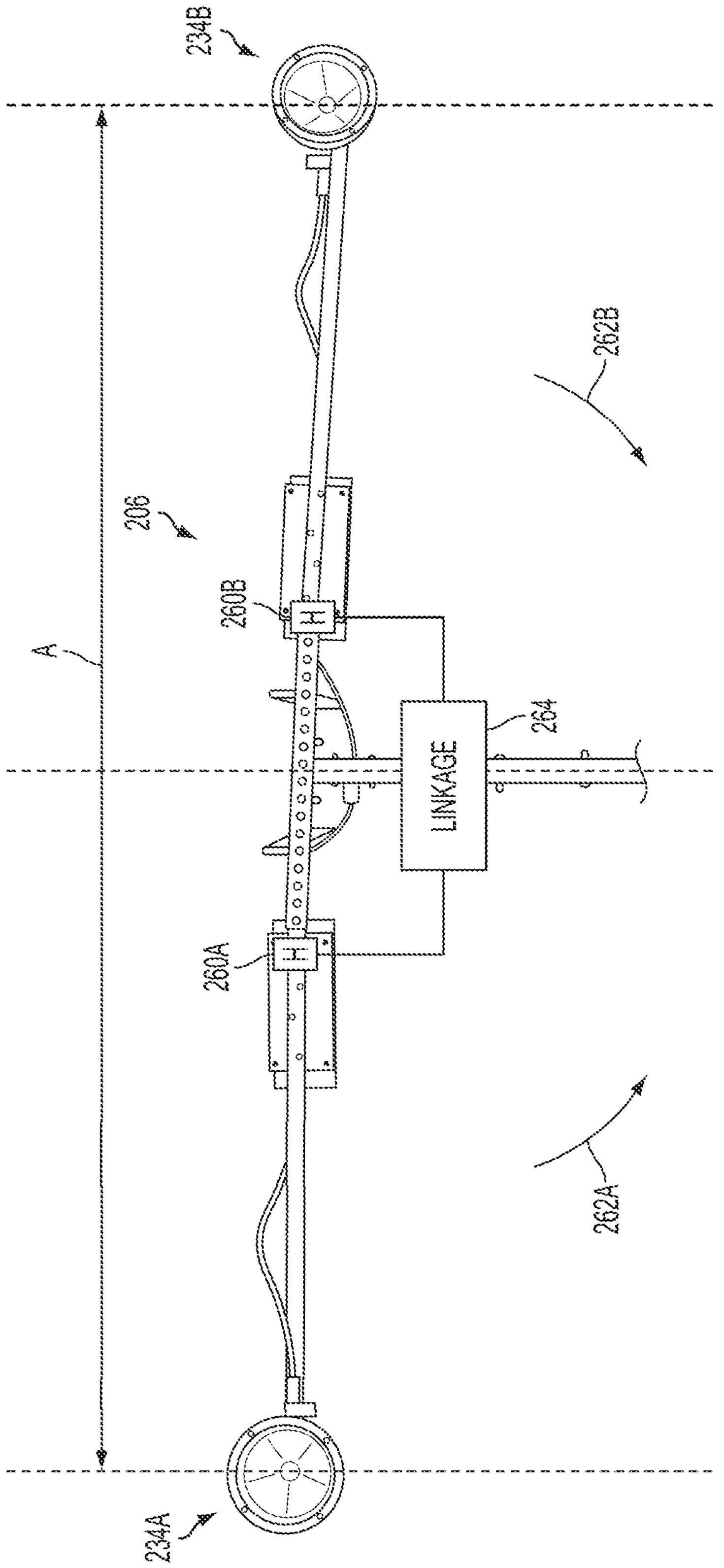
FIG. 20 illustrates another exemplary embodiment of a portion of a portable light device.

Returning to FIG. 19, each of arms 232A, B are coupled to central member 230 by a pin member 250 A, B which is received in apertures in central member 230 and in the respective arms 232A, B. In the illustrated embodiment, central member 230 includes a plurality of spaced apart apertures to provide some adjustability of an overall width of light unit supporting member 206 and light units 234A, B. Referring to FIG. 20, a width A of light unit supporting member 206 and light units 234A, B (from source to source) is about 7 feet, four inches with an adjustment of about 2 inches in each arm 232A, B in either direction. When A is equal to about 7 feet, 4 inches then the overall width of light unit supporting member 206 and light units 234 A, B is about 8 feet, 1 inch.

Pin members 250A, B permit arms 232A, B to be uncovered from central member 230. This further reduces the overall size of portable light unit 200. In one embodiment, with base member 202 placed in a storage position, vertical member adjusted to its lowest height, and arms 232A, B removed from central member 230, all of portable light device will fit within a storage unit having a cylindrical shape with a diameter of about 10 inches and a length of about 5 feet, 2 inches.

Arms 232A and 232B are coupled to central member 230 through hinge members 260A and 260 B, respectively, shown in FIG. 20 which permit arms 232A and 232B to rotate downward in directions 262A and 262B, respectively. In one embodiment, a pin member or other coupler holds the respective arms 232A, B in the use position shown in FIG. 20. In one embodiment, a linkage 264 is coupled to each of arms 232A, B and is supported by vertical member 204. The linkage may move relative to vertical member 204 in directions 212 (to raise arms 232A, B) and 213 (to lower arms 232A, B). As such, arms 232A, B may be lowered or raised in a coordinated motion. In one embodiment, linkage 264 includes a ring that surrounds vertical member 204 and is coupled to vertical member 204 through a knurled knob to lock the position of arms 232A, B relative to vertical member 204.

Referring to FIG. 19, each of light units 234A, B include a light source 270A, B, a reflector 272A, B, a window 274A, B, and a housing 276A, B. In one embodiment, the light sources are a high intensity solid state light source. An exemplary light source is the LIFI STA-40 Series brand light source available from Luxim located at 1171 Borregas Avenue in Sunnyvale, Calif. 94089.

In one embodiment, reflectors 272A, B are conical in shape. In one embodiment, the light sources centered on an axis of the cone of the reflector, the reflector being a straight cone. In one embodiment, the cone has a diameter of about 10 mm adjacent the light source. In one embodiment, reflector 272A, B produces illumination extent of about 120 degrees having a uniformity of intensity of about 2:1 (maximum intensity in the field of illumination to minimum intensity in the field of illumination). The size of the exit aperture of reflector 270A, B affects the crispness of the illumination field at the edge. The larger the exit aperture the crisper the illumination field is at the edge (quick drop-off in intensity).

In one embodiment, the light source 270A, B is fed by radio-frequency ("RF") energy. Light arms 232A, B support drivers 290A, B which supply RF energy to the respective light sources through coaxial cable (coax). The drivers are supported by the light arms 232A, B closer to vertical member 204 than light sources 270A, B. This increases the stability of light device 200. In one embodiment, drivers 290A, B are connected to light sources 276 A, B through extended coaxial cable (extended coax) which permits drivers 290A, B to be mounted over vertical member 204 to central member 230 or to vertical member 204. Exemplary drivers 290A, B are available from Luxim located at 1171 Borregas Avenue in Sunnyvale, Calif. 94089 which convert direct current (DC) to the RF energy needed to drive light sources 270A, B. The drivers 290A, B shown in FIG. 19 also include heat sinks coupled thereto.

Figure 21:
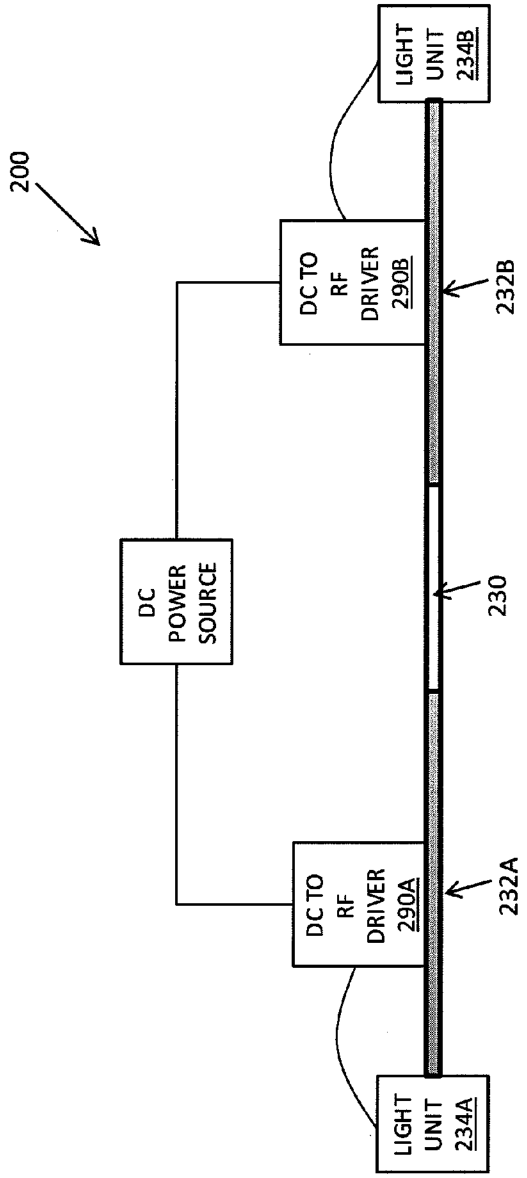
FIG. 21 is a representative top view of portions of the exemplary portable light device of FIG. 19.

Referring to FIG. 21, a representative view of the setup of FIG. 20 is shown. The drivers 290A, B are coupled to a DC power source 292. Each light unit 234A, B has its own driver 290A, B.

Figure 22:
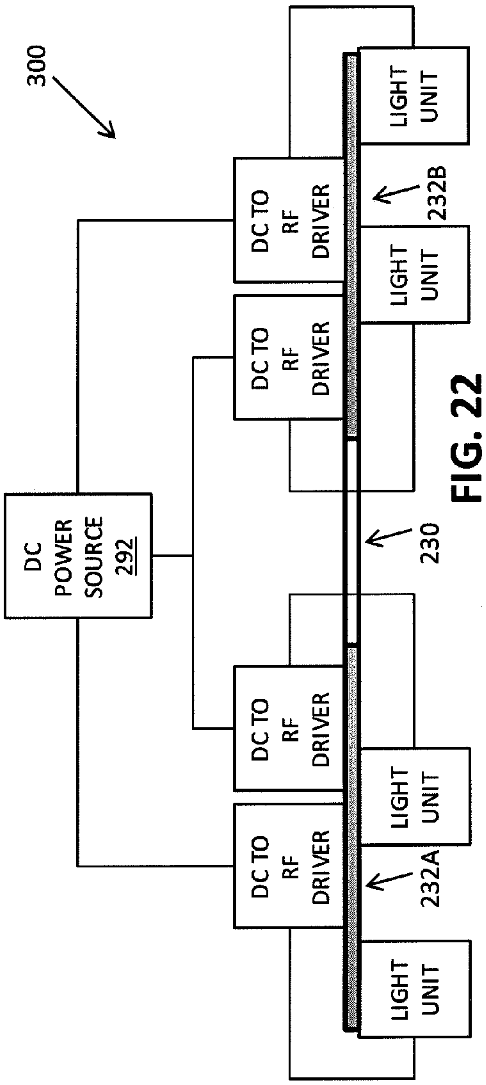
FIG. 22 is a representative top view of another embodiment of an exemplary portable light device.

Referring to FIG. 22, a representative view of another embodiment 300 is shown wherein additional light units are attached to arms 232A, B. These additional light units also have their own drivers which are coupled to DC power source 292. All of the light units may be arranged in a straight row or staggered. In one embodiment an additional light supporting arm is provided in two light units and respective drivers are supported by each light supporting arm.

Figure 23:
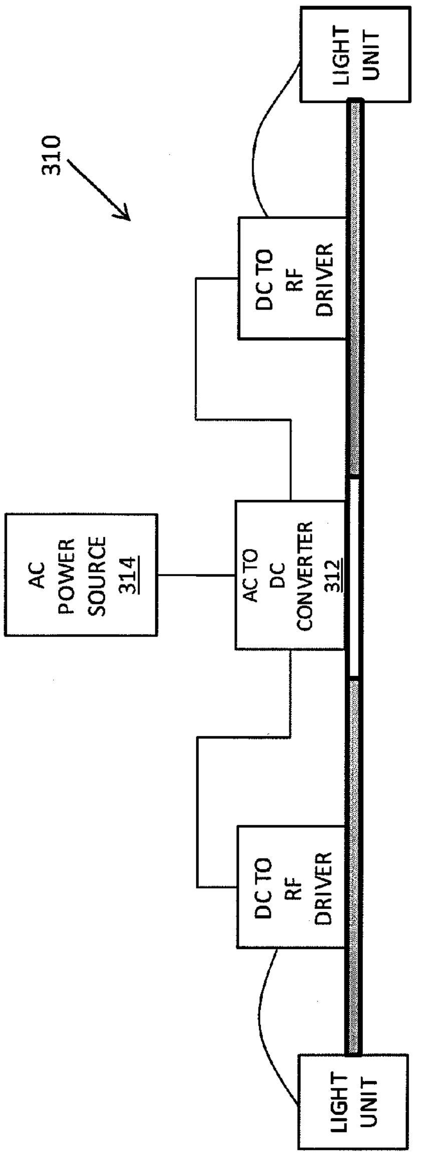
FIG. 23 is a representative top view of still another embodiment of an exemplary portable light device.

Referring to FIG. 23, a representative view of another embodiment 310 is shown wherein and alternating current (AC) to DC converter 312 is provided. Converter 312 is coupled to drivers to supply DC current to the drivers. Converter 312 is also coupled to an AC power source 314, such as a wall outlet.

Figure 24:
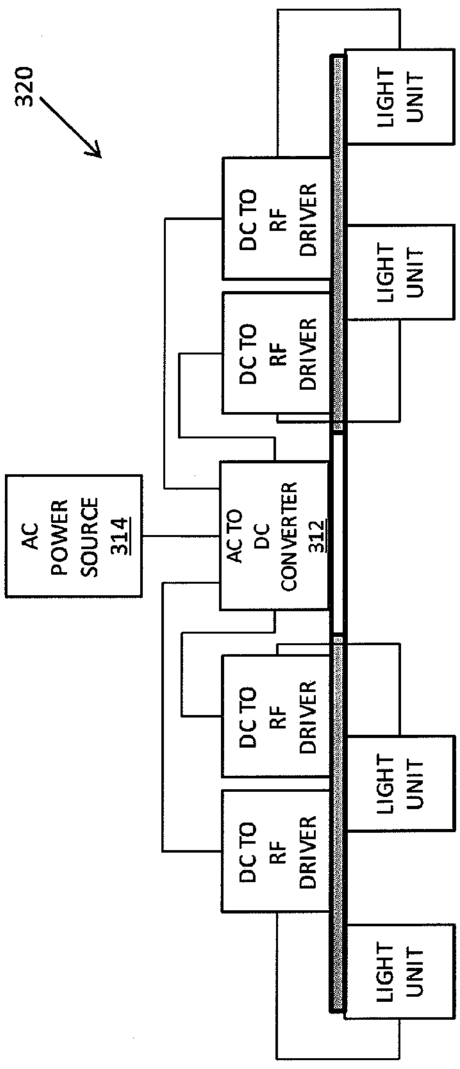
FIG. 24 is a representative top view of yet another embodiment of an exemplary portable light device.

Referring to FIG. 24, a representative view of another embodiment 320 is shown wherein additional light units are attached to arms 232A, B. These additional light units also have their own drivers which are coupled to converter 312. All of the light units may be arranged in a straight row or staggered. In one embodiment an additional light supporting arm is provided in two light units and respective drivers are supported by each light supporting arm.

In one embodiment, portable light device 200 with two light units 234A, B produces the equivalent of about 1 kW of power and with four light units 234A, B the equivalent of about 2 kW of power.

While this disclosure has been described as having exemplary designs and embodiments, the present system may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A mobile lighting apparatus comprising:

a portable frame;

a hydrogen-powered fuel cell mounted on the portable frame, the fuel cell generating electrical power for the mobile lighting apparatus;

at least one fuel storage tank mounted on the portable frame, the fuel storage tank being coupled to the fuel cell to provide fuel to the fuel cell;

a light tower having a proximal end portion pivotably coupled to the portable frame and a distal end portion, the light tower being movable between a stowed position and an upright, deployed position; and a plurality of lights coupled to the distal end portion of the light tower, each of the lights being coupled to the fuel cell to receive electrical power therefrom.

2. The apparatus of claim 1, wherein the portable frame is one of a trailer and a skid.

3. The apparatus of claim 1, wherein the at least one fuel storage tank is a high pressure hydrogen storage tank.

4. The apparatus of claim 3, wherein the high pressure hydrogen storage tank stores hydrogen therein at a pressure of about 2,500 psi to about 10,000 psi.

5. The apparatus of claim 1, wherein the at least one fuel storage tank is at least one metal hydride storage tank configured to supply hydrogen to the hydrogen-powered fuel cell, the at least one metal hydride storage tank including a metal hydride powder located within a heat exchange structure.

6. The apparatus of claim 5, further comprising at least one high pressure hydrogen storage tank located on the portable frame, the high pressure storage tank being coupled to and in fluid communication with the fuel cell and the at least one metal hydride storage tank through a valve to permit hydrogen to be supplied from the at least one high pressure storage tank to at least one the metal hydride storage tank to refuel the metal hydride storage tank.

7. The apparatus of claim 6, further comprising a fluid recirculation system located on the portable frame, the fluid recirculation system being configured to circulate fluid through the heat exchange structure of the at least one metal hydride fuel storage tank, and further comprising a heat exchanger located adjacent the fuel cell, the heat exchanger being in fluid communication with the fluid recirculation system so that the heat exchanger transfers heat generated by the fuel cell to the fluid to warm the metal hydride powder as the heated fluid passes through the heat exchange structure of the metal hydride fuel storage tank.

8. The apparatus of claim 7, further comprising a heater located on the portable frame and configured to provide supplemental heating to the fluid of the fluid recirculation system.

9. The apparatus of claim 8, further comprising a controller coupled to the fluid recirculation system and to the fuel cell, the controller configured to actuate a fan of the fuel cell at selected times when the fuel cell is not powering the lights, the fan being located adjacent the heat exchanger to cool fluid circulated by the fluid recirculation system through the heat exchange structure during refueling of the metal hydride fuel storage tank with hydrogen.

10. The apparatus of claim 1, wherein the fuel cell generates a DC electrical power output to supply power to the plurality of lights at the distal end portion of the light tower.

11. The apparatus of claim 1, wherein the plurality of lights each include a plasma light emitter powered by a radio frequency (RF) driver coupled to the emitter, both the emitter and the driver being coupled to the distal end portion of the light tower.

12. The apparatus of claim 1, further comprising a controller coupled to the plurality of lights to control operation and monitor conditions of the plurality of lights.

13. The apparatus of claim 12, further comprising a graphical user interface coupled to the controller, the graphical user interface being programmed with software to turn the plurality of lights on and off and adjust the intensity of each light in response to user inputs received by the graphical user interface.

14. The apparatus of claim 13, wherein the graphical user interface is a cell phone configured to wirelessly communicate with the controller.

15. The apparatus of claim 1, wherein the plurality of lights include an array of LEDs coupled to the distal end portion of the light tower.

16. The apparatus of claim 1, wherein each of the lights includes at least one glare control baffle coupled thereto.

17. The apparatus of claim 1, wherein each light comprises:

a housing including a rear wall, first and second side panels, a top wall, a bottom wall and a front window cooperating to define an interior region of the housing;

a light emitter located in the interior region of the housing;

a driver for the emitter;

a heat sink coupled to the driver, the heat sink including a plurality of fins for cooling the driver; and a driver mounting portion having a mounting surface and a side wall, the side wall being coupled to one of the heat sink and the driver so that the plurality of fins of the heat sink are exposed, and wherein the mounting surface of the driver mounting portion is coupled to the housing.

18. The apparatus of claim 17, wherein the driver is spaced apart from the mounting surface of the driver mounting portion to provide an air gap to reduce heat transfer from the housing containing the light emitter to the driver.

19. The apparatus of claim 18, wherein the heat sink is configured to maintain a temperature of the driver at less than or equal to 75° C.

20. The apparatus of claim 1, further comprising a controller configured to control operation of the plurality of lights and a motion sensor electrically coupled to the controller, the motion sensor being coupled to the light tower to sense movement in an area near the mobile lighting apparatus, the motion sensor sending a signal to the controller to turn on the lights in response to detecting movement in the area near the mobile light apparatus, and the controller turning off the lights when no movement is detected by the motion sensor for a predetermined time period.

* * * * *